(12) United States Patent
Beck

(10) Patent No.: US 8,683,021 B2
(45) Date of Patent: *Mar. 25, 2014

(54) CLUSTERED FILESYSTEM WITH MEMBERSHIP VERSION SUPPORT

(75) Inventor: Kenneth S. Beck, Morgan Hill, CA (US)

(73) Assignee: Silicon Graphics International, Corp., Milpitas, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 13/211,200

(22) Filed: Aug. 16, 2011

(65) Prior Publication Data

US 2012/0072558 A1    Mar. 22, 2012

Related U.S. Application Data

(60) Continuation of application No. 11/785,255, filed on Apr. 17, 2007, now Pat. No. 8,001,222, which is a division of application No. 10/682,841, filed on Oct. 10, 2003, now abandoned, which is a continuation-in-part of application No. 10/162,258, filed on Jun. 5, 2002, now Pat. No. 6,950,833.

(60) Provisional application No. 60/296,046, filed on Jun. 5, 2001.

(51) Int. Cl.
    *G06F 15/177* (2006.01)
(52) U.S. Cl.
    USPC ........... 709/221; 707/802; 707/899; 707/966; 709/220

(58) Field of Classification Search
    None
    See application file for complete search history.

(56) References Cited

U.S. PATENT DOCUMENTS

| | | |
|---|---|---|
| 5,440,727 A | 8/1995 | Bhide et al. |
| 5,611,050 A | 3/1997 | Theimer et al. |
| 5,668,958 A | 9/1997 | Bendert et al. |
| 5,774,689 A | 6/1998 | Curtis et al. |
| 5,778,387 A | 7/1998 | Wilkerson et al. |
| 5,786,814 A | 7/1998 | Moran et al. |
| 5,859,966 A | 1/1999 | Hayman et al. |
| 5,878,421 A | 3/1999 | Ferrel et al. |
| 5,907,837 A | 5/1999 | Ferrel et al. |
| 5,917,998 A | 6/1999 | Cabrera et al. |
| 5,918,229 A | 6/1999 | Davis et al. |

(Continued)

OTHER PUBLICATIONS

Beck, Office Action, U.S. Appl. No. 12/648,501, Jul. 14, 2011, 7 pgs.

(Continued)

*Primary Examiner* — Robert Beausoliel, Jr.
*Assistant Examiner* — Susan F Rayyan
(74) *Attorney, Agent, or Firm* — Lewis Roca Rothgerber LLP

(57) ABSTRACT

A computer system with read/write access to storage devices creates a snapshot of a data volume at a point in time while continuing to accept access requests to the mirrored data volume by copying before making changes to the base data volume. Multiple snapshots may be made of the same data volume at different points in time. Only data that is not stored in a previous snapshot volume or in the base data volume are stored in the most recent snapshot volume.

20 Claims, 19 Drawing Sheets

(56) References Cited

U.S. PATENT DOCUMENTS

| | | |
|---|---|---|
| 5,987,566 A | 11/1999 | Vishlitzky et al. |
| 5,999,712 A * | 12/1999 | Moiin et al. .............. 709/220 |
| 6,014,669 A | 1/2000 | Slaughter et al. |
| 6,014,699 A | 1/2000 | Ratcliff et al. |
| 6,032,216 A | 2/2000 | Schmuck et al. |
| 6,044,367 A | 3/2000 | Wolff |
| 6,047,294 A | 4/2000 | Deshayes et al. |
| 6,047,332 A | 4/2000 | Viswanathan et al. |
| 6,058,400 A | 5/2000 | Slaughter |
| 6,067,545 A | 5/2000 | Wolff |
| 6,073,132 A | 6/2000 | Gehman |
| 6,073,218 A | 6/2000 | DeKoning et al. |
| 6,088,693 A | 7/2000 | Van Huben et al. |
| 6,094,654 A | 7/2000 | Van Huben et al. |
| 6,101,508 A | 8/2000 | Wolff |
| 6,105,026 A | 8/2000 | Kruglikov et al. |
| 6,105,132 A | 8/2000 | Fritch et al. |
| 6,108,699 A * | 8/2000 | Moiin .............. 709/221 |
| 6,111,893 A | 8/2000 | Volftsun et al. |
| 6,151,688 A | 11/2000 | Wipfel et al. |
| 6,157,635 A | 12/2000 | Wang et al. |
| 6,182,139 B1 | 1/2001 | Brendel |
| 6,185,601 B1 | 2/2001 | Wolff |
| 6,230,185 B1 | 5/2001 | Salas et al. |
| 6,279,032 B1 | 8/2001 | Short et al. |
| 6,289,462 B1 | 9/2001 | McNabb et al. |
| 6,298,425 B1 | 10/2001 | Whitaker et al. |
| 6,314,408 B1 | 11/2001 | Salas et al. |
| 6,324,581 B1 | 11/2001 | Xu et al. |
| 6,341,339 B1 | 1/2002 | Kontothanassis et al. |
| 6,349,343 B1 | 2/2002 | Foody et al. |
| 6,353,837 B1 | 3/2002 | Blumenau |
| 6,363,495 B1 | 3/2002 | MacKenzie et al. |
| 6,370,529 B1 | 4/2002 | Kruglikov et al. |
| 6,389,420 B1 | 5/2002 | Vahalia et al. |
| 6,389,451 B1 | 5/2002 | Hart |
| 6,449,641 B1 * | 9/2002 | Moiin et al. .............. 709/220 |
| 6,453,354 B1 | 9/2002 | Jiang et al. |
| 6,453,426 B1 | 9/2002 | Gamache et al. |
| 6,463,573 B1 | 10/2002 | Maddalozzo, Jr. et al. |
| 6,466,978 B1 | 10/2002 | Mukherjee et al. |
| 6,473,775 B1 | 10/2002 | Kusters et al. |
| 6,487,561 B1 | 11/2002 | Ofek et al. |
| 6,490,631 B1 | 12/2002 | Teich et al. |
| 6,493,715 B1 * | 12/2002 | Funk et al. .............. 709/227 |
| 6,493,804 B1 | 12/2002 | Soltis et al. |
| 6,532,494 B1 * | 3/2003 | Frank et al. .............. 709/224 |
| 6,560,234 B1 | 5/2003 | Ben-Michael et al. |
| 6,594,751 B1 | 7/2003 | Leivent |
| 6,636,499 B1 | 10/2003 | Dowling |
| 6,640,233 B1 | 10/2003 | Lewis et al. |
| 6,651,096 B1 | 11/2003 | Gai et al. |
| 6,654,912 B1 | 11/2003 | Viswanathan et al. |
| 6,674,713 B1 | 1/2004 | Berg et al. |
| 6,681,389 B1 | 1/2004 | Engel et al. |
| 6,697,846 B1 | 2/2004 | Soltis |
| 6,711,559 B1 | 3/2004 | Kogota et al. |
| 6,725,264 B1 | 4/2004 | Christy |
| 6,732,124 B1 | 5/2004 | Koseki et al. |
| 6,732,125 B1 | 5/2004 | Autrey et al. |
| 6,751,616 B1 | 6/2004 | Chan |
| 6,754,181 B1 | 6/2004 | Elliott et al. |
| 6,766,430 B2 | 7/2004 | Arakawa et al. |
| 6,785,892 B1 | 8/2004 | Miller et al. |
| 6,799,189 B2 | 9/2004 | Huxoll |
| 6,799,258 B1 | 9/2004 | Linde |
| 6,804,719 B1 | 10/2004 | Cabrera et al. |
| 6,807,557 B1 * | 10/2004 | Novaes et al. .............. 709/201 |
| 6,819,918 B2 | 11/2004 | Chin et al. |
| 6,829,610 B1 | 12/2004 | Hickman et al. |
| 6,832,330 B1 | 12/2004 | Boudrie et al. |
| 6,839,752 B1 * | 1/2005 | Miller et al. .............. 709/224 |
| 6,868,417 B2 | 3/2005 | Kazar et al. |
| 6,873,627 B1 | 3/2005 | Miller et al. |
| 6,883,170 B1 | 4/2005 | Garcia |
| 6,889,253 B2 * | 5/2005 | Griffin et al. .............. 709/221 |
| 6,904,544 B2 | 6/2005 | DeRolf et al. |
| 6,917,626 B1 | 7/2005 | Duvvury |
| 6,947,940 B2 | 9/2005 | Anderson et al. |
| 6,948,001 B1 | 9/2005 | Bradley |
| 6,950,833 B2 | 9/2005 | Costello et al. |
| 6,952,688 B1 | 10/2005 | Goldman et al. |
| 6,954,437 B1 | 10/2005 | Sylvest et al. |
| 6,957,254 B1 * | 10/2005 | Iterum et al. .............. 709/221 |
| 6,957,439 B1 | 10/2005 | Lewallen |
| 6,959,310 B2 | 10/2005 | Eshel et al. |
| 6,965,569 B1 | 11/2005 | Carolan et al. |
| 6,965,934 B1 | 11/2005 | Reynolds et al. |
| 6,973,455 B1 | 12/2005 | Vahalia et al. |
| 6,976,060 B2 | 12/2005 | Manczak et al. |
| 6,981,005 B1 | 12/2005 | Cabrera et al. |
| 6,983,456 B2 | 1/2006 | Poznanovic et al. |
| 7,006,614 B2 | 2/2006 | Feinberg et al. |
| 7,043,663 B1 | 5/2006 | Pittelkow et al. |
| 7,062,563 B1 | 6/2006 | Lewis et al. |
| 7,072,984 B1 | 7/2006 | Polonsky et al. |
| 7,088,995 B2 | 8/2006 | Rao |
| 7,103,664 B1 * | 9/2006 | Novaes et al. .............. 709/226 |
| 7,103,914 B2 | 9/2006 | Focke et al. |
| 7,127,633 B1 | 10/2006 | Olson et al. |
| 7,133,846 B1 | 11/2006 | Ginter et al. |
| 7,139,925 B2 | 11/2006 | Dinker et al. |
| 7,145,898 B1 | 12/2006 | Elliott |
| 7,159,125 B2 | 1/2007 | Beadles et al. |
| 7,171,121 B1 | 1/2007 | Skarica et al. |
| 7,180,909 B1 | 2/2007 | Achler |
| 7,185,017 B1 | 2/2007 | Cauvin et al. |
| 7,185,076 B1 * | 2/2007 | Novaes et al. .............. 709/223 |
| 7,191,433 B2 | 3/2007 | Narad et al. |
| 7,200,144 B2 | 4/2007 | Terrell et al. |
| 7,203,663 B1 | 4/2007 | Buisman et al. |
| 7,209,551 B1 | 4/2007 | Schroeder et al. |
| 7,225,249 B1 | 5/2007 | Barry et al. |
| 7,225,276 B2 | 5/2007 | Garnett et al. |
| 7,240,100 B1 | 7/2007 | Wein et al. |
| 7,254,645 B2 | 8/2007 | Nishi |
| 7,284,191 B2 | 10/2007 | Grefenstette et al. |
| 7,292,567 B2 | 11/2007 | Terrell et al. |
| 7,315,903 B1 | 1/2008 | Bowden |
| 7,337,241 B2 | 2/2008 | Boucher et al. |
| 7,373,422 B1 | 5/2008 | Paul et al. |
| 7,394,761 B2 | 7/2008 | Foster et al. |
| 7,451,199 B2 | 11/2008 | Kandefer et al. |
| 7,487,509 B2 | 2/2009 | Hugly et al. |
| 7,559,052 B2 | 7/2009 | Kalia et al. |
| 7,627,694 B2 * | 12/2009 | Sreenivasan et al. .......... 709/251 |
| 7,649,908 B2 | 1/2010 | Schwalb |
| 2002/0004857 A1 | 1/2002 | Arakawa et al. |
| 2002/0143801 A1 | 10/2002 | Okamoto et al. |
| 2002/0161855 A1 | 10/2002 | Manczak et al. |
| 2002/0165979 A1 | 11/2002 | Vincent |
| 2002/0174369 A1 | 11/2002 | Miyazaki et al. |
| 2003/0028514 A1 | 2/2003 | Lord et al. |
| 2003/0065760 A1 | 4/2003 | Casper et al. |
| 2003/0078946 A1 | 4/2003 | Costello et al. |
| 2003/0079155 A1 | 4/2003 | Kingsbury |
| 2003/0177187 A1 | 9/2003 | Levine et al. |
| 2003/0177387 A1 | 9/2003 | Osterwalder et al. |
| 2003/0187861 A1 | 10/2003 | Lubbers et al. |
| 2003/0208750 A1 | 11/2003 | Tapper et al. |
| 2003/0217096 A1 | 11/2003 | McKelvie et al. |
| 2004/0001501 A1 | 1/2004 | Delveaux et al. |
| 2004/0022237 A1 | 2/2004 | Elliott et al. |
| 2004/0030951 A1 | 2/2004 | Armangau |
| 2004/0088297 A1 | 5/2004 | Coates et al. |
| 2004/0122917 A1 | 6/2004 | Menon et al. |
| 2004/0153841 A1 | 8/2004 | Beck |
| 2004/0187020 A1 | 9/2004 | Laersssen et al. |
| 2004/0210656 A1 | 10/2004 | Beck et al. |
| 2004/0215830 A1 | 10/2004 | Shenfield |
| 2004/0249904 A1 | 12/2004 | Moore et al. |
| 2004/0250113 A1 * | 12/2004 | Beck .............. 713/201 |
| 2005/0268223 A1 | 12/2005 | Hanson et al. |
| 2006/0004765 A1 | 1/2006 | Anderson et al. |

(56) References Cited

U.S. PATENT DOCUMENTS

| | | | |
|---|---|---|---|
| 2006/0148495 A1 | 7/2006 | Wilson | |
| 2012/0059854 A1* | 3/2012 | Wehrman et al. | 707/782 |
| 2013/0198350 A1* | 8/2013 | Moore et al. | 709/221 |

OTHER PUBLICATIONS

Beck, Office Action, U.S. Appl. No. 13/442,037, Nov. 20, 2012, 16 pgs.
Beck, Office Action, U.S. Appl. No. 13/438,304, Jan. 24, 2013, 10 pgs.
Wehrman, Office Action, U.S. Appl. No. 13/220,257, Feb. 22, 2013, 14 pgs.
Beck, Decision on Appeal, U.S. Appl. No. 10/345,357, Jan. 30, 2009, 9 pgs.
Beck, Examiner's Answer, U.S. Appl. No. 10/345,357, Oct. 9, 2007, 19 pgs.
Beck, Notice of Allowance, U.S. Appl. No. 12/648,501, Nov. 28, 2011, 10 pgs.
Beck, Notice of Allowability, U.S. Appl. No. 12/903,096, Feb. 10, 2012, 16 pgs.
Beck, Notice of Allowability, U.S. Appl. No. 10/345,357, Feb. 3, 2009, 6 pgs.
Beck, Notice of Allowance, U.S. Appl. No. 10/414,239, Aug. 12, 2009, 6 pgs.
Beck, Notice of Allowance, U.S. Appl. No. 11/785,255, Mar. 30, 2011, 8 pgs.
Beck, Notice of Allowance, U.S. Appl. No. 11/785,256, Jun. 4, 2010, 6 pgs.
Beck, Notice of Allowance, U.S. Appl. No. 12/903,096, Dec. 7, 2011, 17 pgs.
Beck, Office Action, U.S. Appl. No. 10/345,357, Apr. 7, 2006, 9 pgs.
Beck, Office Action, U.S. Appl. No. 10/345,357, Oct. 20, 2006, 14 pgs.
Beck, Office Action, U.S. Appl. No. 10/345,357, Jul. 27, 2005, 8 pgs.
Beck, Office Action, U.S. Appl. No. 10/414,239, Mar. 3, 2008, 10 pgs.
Beck, Office Action, U.S. Appl. No. 10/414,239, Aug. 8, 2007, 8 pgs.
Beck, Office Action, U.S. Appl. No. 10/414,239, Aug. 21, 2008, 6 pgs.
Beck, Office Action, U.S. Appl. No. 10/414,239, Jan. 25, 2007, 9 pgs.
Beck, Office Action, U.S. Appl. No. 10/414,239, Feb. 27, 2009, 9 pgs.
Beck, Office Action, U.S. Appl. No. 10/414,239, May 31, 2006, 7 pgs.
Beck, Office Action, U.S. Appl. No. 11/785,255, Apr. 16, 2009, 8 pgs.
Beck, Office Action, U.S. Appl. No. 11/785,255, Sep. 17, 2010, 15 pgs.
Beck, Office Action, U.S. Appl. No. 11/785,255, Nov. 24, 2009, 10 pgs.
Beck, Office Action, U.S. Appl. No. 11/785,255, Mar. 30, 2010, 14 pgs.
Beck, Office Action, U.S. Appl. No. 11/785,256, Sep. 16, 2009, 5 pgs.
Beck, Office Action, U.S. Appl. No. 11/785,256, Mar. 24, 2010, 7 pgs.
Beck, Office Action, U.S. Appl. No. 12/903,096, Jun. 24, 2011, 16 pgs.
Cruciani, Notice of Allowance, U.S. Appl. No. 10/414,245, Mar. 23, 2010, 11 pgs.
Cruciani, Office Action, U.S. Appl. No. 10/414,245, Sep. 2, 2009, 8 pgs.
Cruciani, Office Action, U.S. Appl. No. 10/414,245, Dec. 18, 2008, 7 pgs.
Cruciani, Office Action, U.S. Appl. No. 10/414,245, Aug. 13, 2007, 10 pgs.
Cruciani, Office Action, U.S. Appl. No. 10/414,245, Mar. 18, 2008, 9 pgs.
Cruciani, Office Action, U.S. Appl. No. 10/414,245, Dec. 21, 2006, 7 pgs.
Eisenhauer, Event Services for High Performance Computing, 9th International Symposium on High Performance Distributed Computing, Aug. 1-4, 2000, 113-130 pgs.
Eisenhauer, Native Data Representation, an Efficient Wire Format for High-Performance Distributed Computing, IEEE Transactions on Parallel and Distributed Systems, V13, I12, Dec. 2002, 1234-1246 pgs.
Falkner, The Provision of Relocation Transparency Through a Formalized Naming System in a Distributed Mobile Object System, Oct. 3, 2000, 1-197 pgs.
Krueger, Small Computer Systems Interface Protocol Over the Internet (iSCSI) Requirements and Design Considerations, Jul. 2002, 26 pgs.
McCloghrie, Managed Objects for Controlling the Collection and Storage of Accounting Information for Connection-Oriented Networks, Feb. 1999, 29 pgs.
Moore, Notice of Allowance, U.S. Appl. No. 10/414,236, Jul. 2, 2009, 7 pgs.
Moore, Notice of Allowance, U.S. Appl. No. 12/615,930, Aug. 10, 2012, 17 pgs.
Moore, Office Action, U.S. Appl. No. 10/414,236, Dec. 2, 2008, 10 pgs.
Moore, Office Action, U.S. Appl. No. 10/414,236, Oct. 2, 2007, 8 pgs.
Moore, Office Action, U.S. Appl. No. 10/414,236, Apr. 10, 2007, 7 pgs.
Moore, Office Action, U.S. Appl. No. 12/615,930, Jan. 19, 2011, 11 pgs.
Moore, Office Action, U.S. Appl. No. 12/615,930, Jul. 28, 2011, 13 pgs.
Moore, Office Action, U.S. Appl. No. 12/615,930, Nov. 29, 2011, 7 pgs.
Pazel, Neptune: A Dynamic Resource Allocation and Planning System for a Cluster Computing Utility, 2002, 8 pgs.
Pinheiro, S-DSM for Heterogeneous Machine Architectures, U. Rochester, Apr. 2000, 7 pgs.
Sjoberg, Real-time Transport Protocol (RIP) Payload Format and File Storage Format for the Adaptive Multi-Rate (AMR) and Adaptive Multi-Rate Wideband (AMR-WB) Audio Codecs, Jun. 2002, 49 pgs.
Tanenbaum, Structured Computer Organization, 3rd Ed., Prentice Hall, 1990, 43-44 pgs.
Theimer, Overlook: Scalable Name Service on an Overlay Network, 2002, 33 pgs.
Wehrman, Notice of Allowance, U.S. Appl. No. 10/620,387, Apr. 28, 2011, 7 pgs.
Wehrman, Office Action, U.S. Appl. No. 10/620,387, Jan. 2, 2008, 6 pgs.
Wehrman, Office Action, U.S. Appl. No. 10/620,387, Aug. 4, 2006, 9 pgs.
Wehrman, Office Action, U.S. Appl. No. 10/620,387, Jun. 13, 2007, 9 pgs.
Wehrman, Office Action, U.S. Appl. No. 10/620,387, May 13, 2010, 18 pgs.
Wehrman, Office Action, U.S. Appl. No. 10/620,387, Jun. 19, 2008, 9 pgs.
Wehrman, Office Action, U.S. Appl. No. 10/620,387, Jan. 23, 2009, 10 pgs.
Wehrman, Office Action, U.S. Appl. No. 10/620,387, Jan. 24, 2006, 7 pgs.
Wehrman, Office Action, U.S. Appl. No. 10/620,387, Sep. 30, 2009, 18 pgs.
Wehrman, Office Action, U.S. Appl. No. 10/620,387, Sep. 30, 2010, 17 pgs.
Wehrman, Office Action, U.S. Appl. No. 13/220,257, Apr. 5, 2012, 14 pgs.

* cited by examiner

CLUSTERED FILESYSTEM WITH MEMBERSHIP VERSION SUPPORT

CROSS REFERENCE TO RELATED APPLICATIONS

This application is a continuation of U.S. application Ser. No. 11/785,255 and now U.S. Pat. No. 8,001,222, which is a divisional of U.S. application Ser. No. 10/682,841 and which is a continuation-in-part of U.S. application Ser. No. 10/162,258 and now U.S. Pat. No. 6,950,833, which claims benefit to U.S. Provisional Application No. 60/296,046, all of which are hereby incorporated by reference herein.

TECHNICAL FIELD OF THE INVENTION

The present invention is related to data storage, and more particularly to a system and method for creating a copy of data during operation of a computing system.

BACKGROUND OF THE INVENTION

A storage area network (SAN) provides direct, high-speed physical connections, e.g., Fibre Channel connections, between multiple hosts and disk storage. The emergence of SAN technology offers the potential for multiple computer systems to have high-speed access to shared data. However, the software technologies that enable true data sharing are mostly in their infancy. While SANS offer the benefits of consolidated storage and a high-speed data network, existing systems do not share that data as easily and quickly as directly connected storage. Data sharing is typically accomplished using a network filesystem such as Network File System (NFS™ by Sun Microsystems, Inc. of Santa Clara, Calif.) or by manually copying files using file transfer protocol (FTP), a cumbersome and unacceptably slow process.

The challenges faced by a distributed SAN filesystem are different from those faced by a traditional network filesystem. For a network filesystem, all transactions are mediated and controlled by a file server. While the same approach could be transferred to a SAN using much the same protocols, that would fail to eliminate the fundamental limitations of the file server or take advantage of the true benefits of a SAN. The file server is often a bottleneck hindering performance and is always a single point of failure. The design challenges faced by a shared SAN filesystem are more akin to the challenges of traditional filesystem design combined with those of high-availability systems.

Traditional filesystems have evolved over many years to optimize the performance of the underlying disk pool. Data concerning the state of the filesystem (metadata) is typically cached in the host system's memory to speed access to the filesystem. This caching—essential to filesystem performance—is the reason why systems cannot simply share data stored in traditional filesystems. If multiple systems assume they have control of the filesystem and cache filesystem metadata, they will quickly corrupt the filesystem by, for instance, allocating the same disk space to multiple files. On the other hand, implementing a filesystem that does not allow data caching would provide unacceptably slow access to all nodes in a cluster.

Systems or software for connecting multiple computer systems or nodes in a cluster to access data storage devices connected by a SAN have become available from several companies. EMC Corporation of Hopkington, Massachusetts offers HighRoad file system software for their Celerra™ Data Access in Real Time (DART) file server. Veritas Software of Mountain View, Calif. offers SANPoint which provides simultaneous access to storage for multiple servers with failover and clustering logic for load balancing and recovery. Sistina Software of Minneapolis, Minn. has a similar clustered file system called Global File System™ (GFS). Advanced Digital Information Corporation of Redmond, Wash. has several SAN products, including Centra Vision for sharing files across a SAN. As a result of mergers the last few years, Hewlett-Packard Company of Palo Alto, Calif. has more than one cluster operating system offered by their Compaq Computer Corporation subsidiary which use the Cluster File System developed by Digital Equipment Corporation in their TruCluster and OpenVMS Cluster products. However, none of these products are known to provide direct read and write over a Fibre Channel by any node in a cluster. What is desired is a method of accessing data within a SAN which provides true data sharing by allowing all SAN-attached systems direct access to the same filesystem. Furthermore, conventional hierarchal storage management uses an industry standard interface called data migration application programming interface (DMAPI). However, if there are five machines, each accessing the same file, there will be five separate events and there is nothing tying those DMAPI events together.

SUMMARY OF THE INVENTION

It is an aspect of the present invention to create a point-in-time image of a filesystem without interruption, using minimal storage.

It is another aspect of the present invention to allow point-in-time backups of a filesystem while the base filesystem is still being used.

It is a further aspect of the present invention to keep low overhead "versions" of a filesystem online.

It is yet another aspect of the present invention to provide a recovery mechanism in the event of data loss.

It is still further aspect of the present invention to create archive or backup volumes that are readable and write-able.

At least one of the above aspects can be attained by a method of maintaining a copy of at least one data volume in a computer system for at least one point in time, including establishing a first repository for a first snapshot of a base volume; and prior to a write operation to a first region of the base volume, copying the first region of the base volume to the first repository. Preferably, the copying is performed only for regions in the base volume for which write operations are detect and further, only if the first region was not previously written to the first repository. Preferably, data is read from a second region of the first snapshot by determining whether the second region has changed in the base volume, reading the second region from the first repository if the second region has changed; and reading the second region from the base volume if the second region has not changed.

The method also include establishing a second repository for a second snapshot of the base volume at a point in time later than the first repository was established and, prior to writing to a third region of the base volume after the second repository was established, copying the third region of the base volume to the second repository. Under these circumstances, data is preferably read from a fourth region of the second snapshot by determining whether the fourth region has changed in the base volume since establishing the second repository, reading the fourth region from the second repository if the fourth region has changed since establishing the second repository, and reading the fourth region from the base volume if the fourth region has not changed since establishing the second repository.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

Following are several terms used herein that are in common use in describing filesystems or SANs, or are unique to the disclosed system_ Several of the terms will be defined more thoroughly below.
bag indefinitely sized container object for tagged data
behavior
chain vnode points to head, elements are inode, and vnode operations
cfs or CXFS cluster file system (CXFS is from Silicon Graphics, Inc.)
chandle client handle: barrier lock, state information and an object pointer
CMS cell membership services
CORPSE common object recovery for server endurance
dcvn file system specific components for vnode in client, i.e., inode
DMAPI data migration application programming interface
DNS distributed name service, such as SGI's white pages
dsvn cfs specific components for vnode in server, i.e., inode
heartbeat network message indicating a node's presence on a LAN
HSM hierarchical storage management
inode file system specific information, i.e., metadata
KORE kernel object relocation engine
manifest bag including object handle and pointer for each data structure
quiesce render quiescent, i.e., temporarily inactive or disabled
RPC remote procedure call
token an object having states used to control access to data & metadata
vfs virtual file system representing the file system itself
vnode virtual inode to manipulate files without file system details
XVM volume manager for CXFS In addition there are three types of input/output operations that can be performed in a system according to the present invention: buffered I/O, direct I/O and memory mapped I/O. Buffered I/O are read and write operations via system calls where the source or result of the I/O operation can be system memory on the machine executing the I/O, while direct I/O are read and write operations via system calls where the data is transferred directly between the storage device and the application programs memory without being copied through system memory.

Memory mapped I/O are read and write operations performed by page fault. The application program makes a system call to memory map a range of a file. Subsequent read memory accesses to the memory returned by this system call cause the memory to be filled with data from the file. Write accesses to the memory cause the data to be stored in the file. Memory mapped I/O uses the same system memory as buffered I/O to cache parts of the file.

Figure 1:
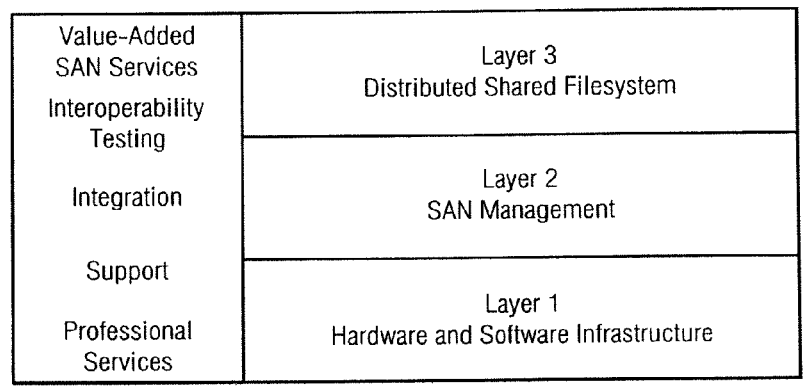
FIG. 1 is a layer model of a storage area network.

A SAN layer model is illustrated in FIG. 1. SAN technology can be conveniently discussed in terms of three distinct layers. Layer 1 is the lowest layer which includes basic hardware and software components necessary to construct a working SAN. Recently, layer 1 technology has become widely available, and interoperability between vendors is improving rapidly. Single and dual arbitrated loops have seen the earliest deployment, followed by fabrics of one or more Fibre Channel switches.

Layer 2 is SAN management and includes tools to facilitate monitoring and management of the various components of a SAN. All the tools used in direct-attach storage environments are already available for SANs. Comprehensive LAN management style tools that tie common management functions together are being developed. SAN management will soon become as elegant as LAN management.

The real promise of SANs, however, lies in layer 3, the distributed, shared filesystem. Layer 1 and layer 2 components allow a storage infrastructure to be built in which all SAN-connected computer systems potentially have access to all SAN-connected storage, but they don't provide the ability to truly share data. Additional software is required to mediate and manage shared access, otherwise data would quickly become corrupted and inaccessible.

In practice, this means that on most SANs, storage is still partitioned between various systems. SAN managers may be able to quickly reassign storage to another system in the face of a failure and to more flexibly manage their total available storage, but independent systems cannot simultaneously access the same data residing in the same filesystems.

Shared, high-speed data access is critical for applications where large data sets are the norm. In fields as diverse as satellite data acquisition and processing, CAD/CAM, and seismic data analysis, it is common for files to be copied from a central repository over the LAN to a local system for processing and then copied back. This wasteful and inefficient process can be completely avoided when all systems can access data directly over a SAN.

Shared access is also crucial for clustered computing. Access controls and management are more stringent than with network filesystems to ensure data integrity. In most existing high-availability clusters, storage and applications are partitioned and another server assumes any failed server's storage and workload. While this may prevent denial of service in case of a failure, load balancing is difficult and system and storage bandwidth is often wasted. In high-performance computing clusters, where workload is split between multiple systems, typically only one system has direct data access. The other cluster members are hampered by slower data access using network file systems such as NFS.

In a preferred embodiment, the SAN includes hierarchical storage management (HSM) such as data migration facility (DMF) by Silicon Graphics, Inc. (SGI) of Mountain View, Calif. The primary purpose of HSM is to preserve the economic value of storage media and stored data. The high input/output bandwidth of conventional machine environments is sufficient to overrun online disk resources. HSM transparently solves storage management issues, such as managing private tape libraries, making archive decisions, and journaling the storage so that data can be retrieved at a later date.

Preferably, a volume manager, such as XVM from SGI supports the cluster environment by providing an image of storage devices across all nodes in a cluster and allowing for administration of the devices from any cell in the cluster. Disks within a cluster can be assigned dynamically to the entire cluster or to individual nodes within the cluster. In one embodiment, disk volumes are constructed using XVM to provide disk striping, mirroring, concatenation and advanced recovery features. Low-level mechanisms for sharing disk volumes between systems are provided, making defined disk volumes visible across multiple systems. XVM is used to combine a large number of disks across multiple Fibre Channels into high transaction rate, high bandwidth, and highly reliable configurations. Due to its scalability, XVM provides an excellent complement to CXFS and SANs. XVM is designed to handle mass storage growth and can configure millions of terabytes (exabytes) of storage in one or more filesystems across thousands of disks.

Figure 2:
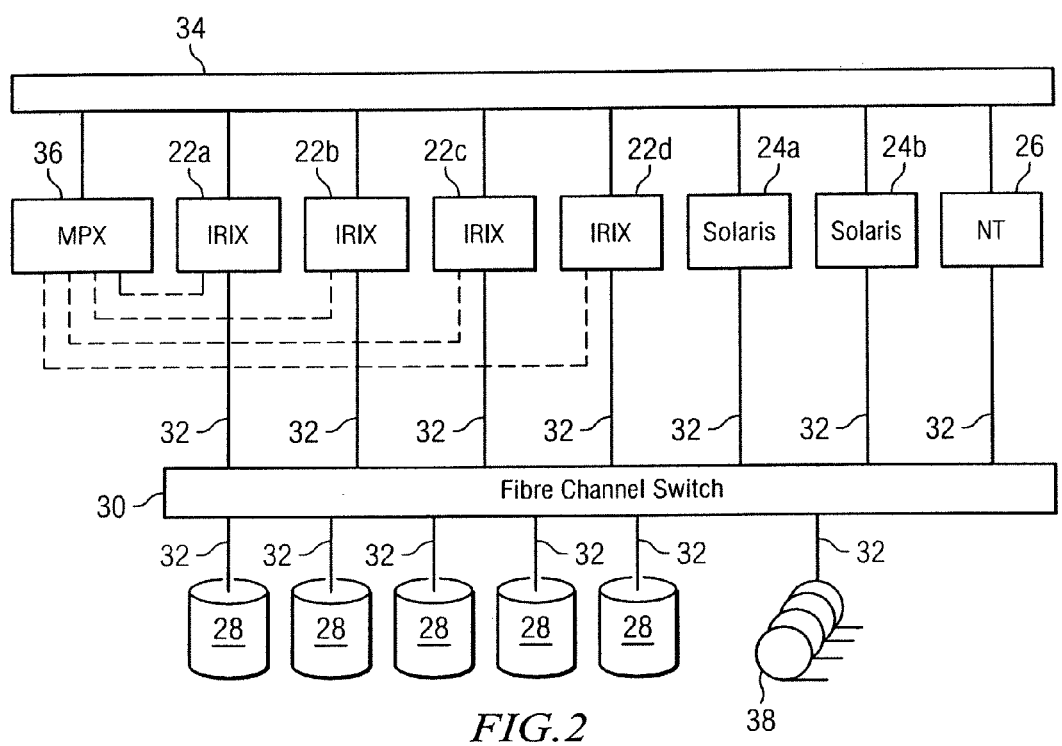
FIG. 2 is a block diagram of a cluster computing system.

An example of a cluster computing system formed of heterogeneous computer systems or nodes is illustrated in FIG. 2. In the example illustrated in FIG. 2, nodes 22 run the IRIX operating system from SGI while nodes 24 run the Solaris operating system from Sun and node 26 runs the Windows NT operating system from Microsoft Corporation of Redmond Wash. Each of these nodes is a conventional computer system including at least one, and in many cases several processors, local or primary non-transitory memory, some of which is used as a disk cache, input/output (I/O) interfaces I/O devices, such as one or more displays or printers. According to the present invention, the cluster includes a storage area network in which mass or secondary storage, such as disk drives 28 are connected to the nodes 22, 24, 26 via Fibre Channel switch 30 and Fibre Channel connections 32. The nodes 22, 24, 26 are also connected via a local area network (LAN) 34, such as an Ethernet, using TCP/IP to provide messaging and heartbeat signals. In the preferred embodiment, a serial port multiplexer 36 is also connected to the LAN and to a serial port of each node to enable hardware reset of the node. In the example illustrated in FIG. 2, only IRIX nodes 22 are connected to serial port multiplexer 36.

Other kinds of non-transitory storage devices besides disk drives 28 may be connected to the Fibre Channel switch 30 via Fibre Channel connections 32. Tape drives 38 are illustrated in FIG. 2, but other conventional non-transitory storage devices may also be connected. Alternatively, tape drives 38 (or other non-transitory storage devices) may be connected to one or more of nodes 22, 24, 26, e.g., via SCSI connections (not shown).

In a conventional SAN, the disks are partitioned for access by only a single node per partition and data is transferred via the LAN. On the other hand, if node 22c needs to access data in a partition to which node 22b has access, according to the present invention very little of the data stored on disk 28 is transmitted over LAN 34. Instead LAN 34 is used to send metadata describing the data stored on disk 28, token messages controlling access to the data, heartbeat signals and other information related to cluster operation and recovery.

In the preferred embodiment, the cluster filesystem is layer that distributes input/output directly between the disks and the nodes via Fibre Channel 30,32 while retaining an underlying layer with an efficient input/output path using asynchronous buffering techniques to avoid unnecessary physical input/outputs by delaying writes as long as possible. This allows the filesystem to allocate the data space efficiently and often contiguously. The data tends to be allocated in large contiguous chunks, which yields sustained high bandwidths.

Preferably, the underlying layer uses a directory structure based on B-trees, which allow the cluster filesystem to maintain good response times, even as the number of files in a directory grows to tens or hundreds of thousands of files. The cluster filesystem adds a coordination layer to the underlying filesystem layer. Existing filesystems defined in the underlying layer can be migrated to a cluster filesystem according to the present invention without necessitating a dump and restore (as long as the storage can be attached to the SAN). For example, in the IRIX nodes 22, XVM is used for volume management and XFS is used for filesystem access and control. Thus, the cluster filesystem layer is referred to as CXFS.

Figure 3:
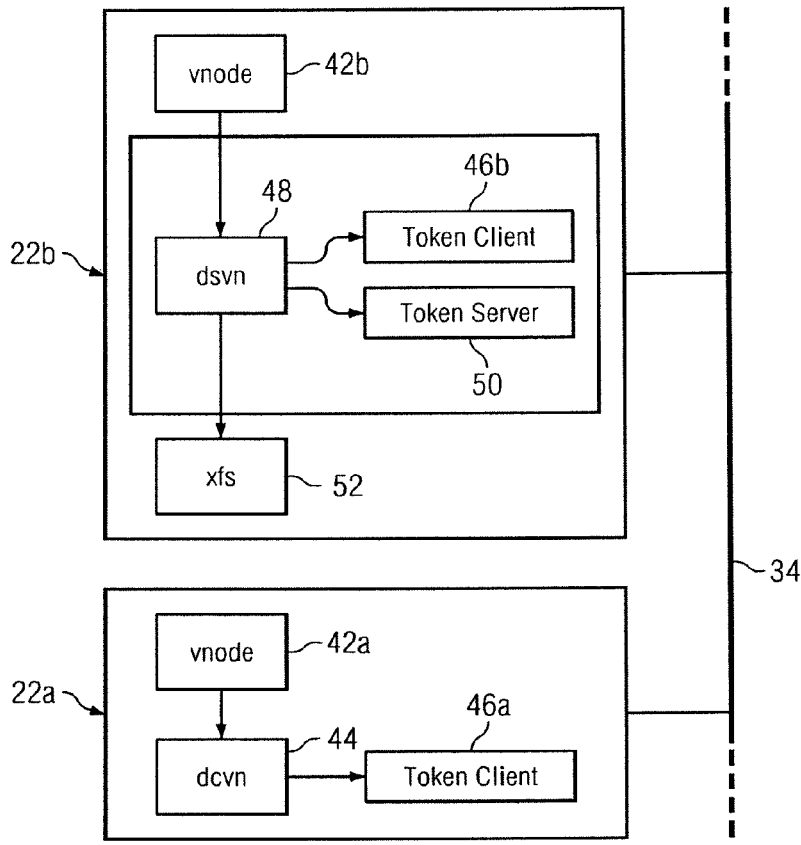
FIG. 3 is a block diagram of filesystem specific and non-specific layers in a metadata server and a metadata client.

In the cluster file system of the preferred embodiment, one of the nodes, e.g., IRIX node 22b, is a metadata server for the other nodes 22, 24, 26 in the cluster which are thus metadata clients with respect to the file system(s) for which node 22b is a metadata server. Other node(s) may serve as metadata server(s) for other file systems. All of the client nodes 22, 24 and 26, including metadata server 22b, provide direct access to files on the filesystem. This is illustrated in FIG. 3 in which "vnode" 42 presents a file system independent set of operations on a file to the rest of the operating system. In metadata client 22a the vnode 42 services requests using the clustered filesystem routines associated with dcvn 44 which include token client operations 46 described in more detail below. However, in metadata server 22b, the file system requests are serviced by the clustered filesystem routines associated with dsvn 48 which include token client operations 46 and token server operations 50. The metadata server 22b also maintains the metadata for the underlying filesystem, in this case XFS 52.

Figure 4:
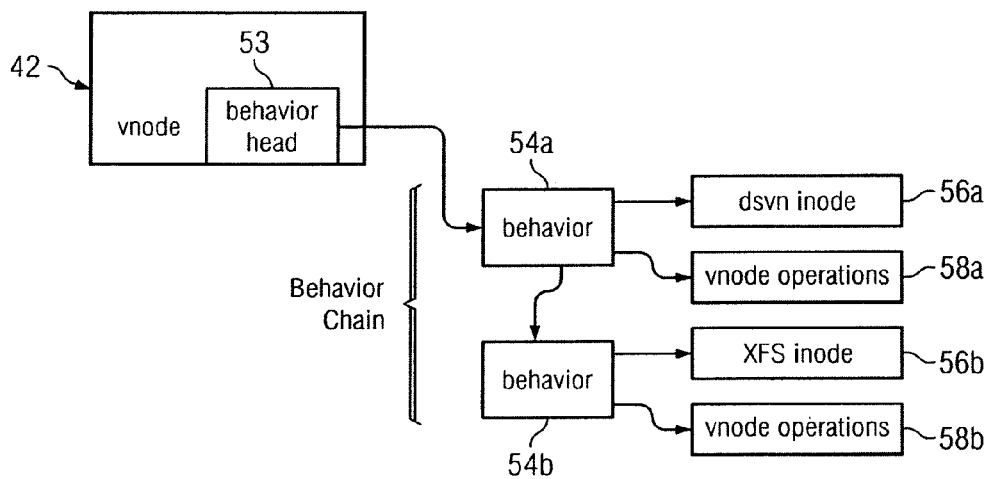
FIG. 4 is a block diagram of behavior chains.

As illustrated in FIG. 4, according to the present invention a vnode 52 contains the head 53 of a chain of behaviors 54. Each behavior points to a set of vnode operations 58 and a filesystem specific inode data structure 56. In the case of files which are only being accessed by applications running directly on the metadata server 22b, only behavior 54b is present and the vnode operations are serviced directly by the underlying filesystem, e.g., XFS. When the file is being accessed by applications running on client nodes then behavior 54a is also present. In this case the vnode operations 58a manage the distribution of the file metadata between nodes in the cluster, and in turn use vnode operations 58b to perform requested manipulations of the file metadata. The vnode operations 58 are typical file system operations, such as create, lookup, read, write.

Token Infrastructure

The tokens operated on by the token client 46 and token server 50 in an exemplary embodiment are listed below. Each token may have three levels, read, write, or shared write. Token clients 46a and 46b (FIG. 3) obtain tokens from the token server 50. Each of the token levels, read, shared write and write, conflicts with the other levels, so a request for a token at one level will result in the recall of all tokens at different levels prior to the token being granted to the client which requested it_ The write level of a token also conflicts with other copies of the write token, so only one client at a time can have the write token. Different tokens are used to protect access to different parts of the data and metadata associated with a file.

Certain types of write operations may be performed simultaneously by more than one client, in which case the shared write level is used. An example is maintaining the timestamps for a file. To reduce overhead, when reading or writing a file, multiple clients can hold the shared write level and each update the timestamps locally. If a client needs to read the timestamp, it obtains the read level of the token. This causes all the copies of the shared write token to be returned to the metadata server 22b along with each client's copy of the file timestamps. The metadata server selects the most recent timestamp and returns this to the client requesting the information along with the read token.

Acquiring a token puts a reference count on the token, and prevents it from being removed from the token client. If the token is not already present in the token client, the token server is asked for it. This is sometimes also referred to as obtaining or holding a token. Releasing a token removes a reference count on a token and potentially allows it to be returned to the token server. Recalling or revoking a token is the act of asking a token client to give a token back to the token server. This is usually triggered by a request for a conflicting level of the token.

When a client needs to ask the server to make a modification to a file, it will frequently have a cached copy of a token at a level which will conflict with the level of the token the server will need to modify the file. In order to minimize network traffic, the client 'lends' its read copy of the token to the server for the duration of the operation, which prevents the server from having to recall it. The token is given back to the client at the end of the operation.

Following is a list of tokens in an exemplary embodiment:

DVN_EXIST is the existence token. Represents the fact that a client has references to the vnode. Each client which has a copy of the inode has the read level of this token and keeps it until they are done with the inode. The client does not acquire and release this token around operations, it just keeps it in the token client. The server keeps one reference to the vnode (which keeps it in memory) for each client which has an existence token. When the token is returned, this reference count is dropped. If someone unlinks the file—which means it no longer has a name, then the server will conditionally recall all the existence tokens. A conditional recall means the client is allowed to refuse to send the token back. In this case the clients will send back all the tokens and state they have for the vnode if no application is currently using it. Once all the existence tokens are returned, the reference count on the server's vnode drops to zero, and this results in the file being removed from the filesystem.

DVN_IOEXCL is the I/O exclusive token. The read token is obtained by any client making read or write calls on the vnode. The token is held across read and write operations on the file. The state protected by this token is what is known as the I/O exclusive state. This state is cached on all the clients holding the token. If the state is true then the client knows it is the only client performing read/write operations on the file. The server keeps track of when only one copy of the token has been granted to a client, and before it will allow a second copy to be given out, it sends a message to the first client informing it that the I/O exclusive state has changed from true to false. When a client has an I/O exclusive state of true is allowed to cache changes to the file more aggressively than otherwise.

DVN_IO is the IO token which is used to synchronize between read and write calls on different computers. CXFS enforces a rule that buffered reads are atomic with respect to buffered writes, and writes are atomic with respect to other writes. This means that a buffered read operation happens before or after a write, never during a write. Buffered read operations hold the read level of the token, buffered writes hold the write level of the token. Direct reads and writes hold the read level of the token.

DVN_PAGE_DIRTY represents the right to hold modified file data in memory on a system.

DVN_PAGE_CLEAN represents the right to hold unmodified file data in memory on a computer. Combinations of levels of DVN_PAGE_DIRTY and DVN_PAGE_CLEAN are used to maintain cache coherency across the cluster.

DVN_NAME is the name token. A client with this token in the token client for a directory is allowed to cache the results of lookup operations within the directory. So if we have a name we are looking up in a directory, and we have done the same lookup before, the token allows us to avoid sending the lookup to the server. An operation such as removing or renaming, or creating a file in a directory will obtain the write level of the token on the server and recall the read token—invalidating any cached names for that directory on those clients.

DVN_ATTR protects fields such as the ownership information, the extended attributes of the file, and other small pieces of information. Held by the client for read, and by the server for write when the server is making modifications. Recall of the read token causes the invalidation of the extended attribute cache.

DVN_TIMES protects timestamp fields on the file. Held at the read level by hosts who are looking at timestamps, held at the shared write level by hosts doing read and write operations, and held at the write level on the server when setting timestamps to an explicit value. Recall of the shared write token causes the client to send back its modified timestamps, the server uses the largest of the returned values as the true value of the timestamp.

DVN_SIZE protects the size of the file, and the number of disk blocks in use by the file. Held for read by a client who wants to look at the size, or for write by a client who has a true IO exclusive state. This allows the client to update the size of the file during write operations without having to immediately send the updated size back to the server.

DVN_EXTENT protects the metadata which indicates where the data blocks for a file are on disk, known as the extent information. When a client needs to perform read or write operation it obtains the read level of the token and gets of a copy of the extent information with it. Any modification of the extent information is performed on the server and is protected by the write level of the token. A client which needs space allocated in the file will lend its read token to the server for this operation.

DVN_DMAPI protects the DMAPI event mask. Held at the read level during IO operations to prevent a change to the DMAPI state of the file during the IO operation. Only held for write by DMAPI on the server.

Data coherency is preferably maintained between the nodes in a cluster which are sharing access to a file by using combinations of the DVN_PAGE_DIRTY and DVN_PAGE_CLEAN tokens for the different forms of input/output. Buffered and memory mapped read operations hold the DVN_PAGE_CLEAN_READ token, while buffered and memory mapped write operations hold the DVN_PAGE_CLEAN_WRITE and VN_PAGE_DIRTY_WRITE tokens. Direct read operations hold the DVN_PAGE_CLEAN_SHARED_WRITE token and direct write operations hold the DVN_PAGE_CLEAN_SHARED_WRITE and VN_PAGE_DIRTY_SHARED_WRITE tokens. Obtaining these tokens causes other nodes in the cluster which hold conflicting levels of the tokens to return their tokens. Before the tokens are returned, these client nodes perform actions on their cache of file contents. On returning the DVN_PAGE_DIRTY_WRITE token a client node must first flush any modified data for the file out to disk and then discard it from cache. On returning the DVN_PAGE_CLEAN_WRITE token a client node must first flush any modified data out to disk. If both of these tokens are being returned then both the flush and discard operations are performed. On returning the DVN_PAGE_CLEAN_READ token to the server, a client node must first discard any cached data for the file it has in system memory.

Figure 5:
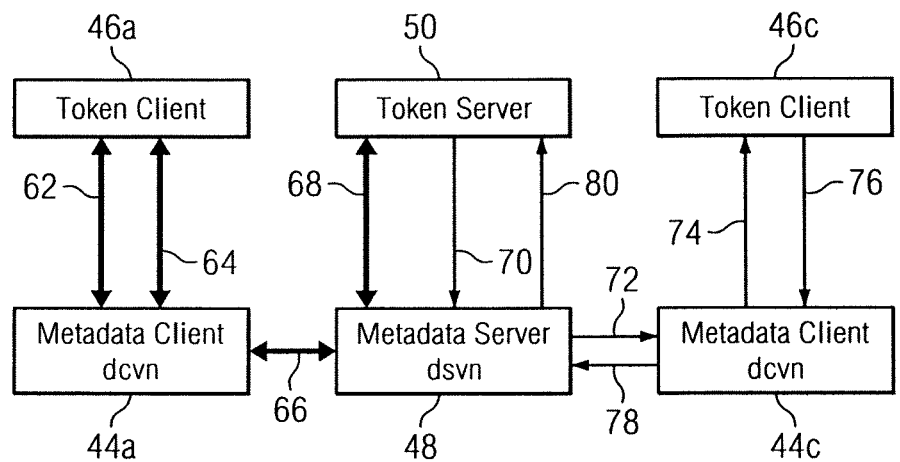
FIG. 5 is a block diagram showing the request and return of tokens.

An illustration to aid in understanding how tokens are requested and returned is provided in FIG. 5. A metadata client (dcvn) needs to perform an operation, such as a read operation on a file that has not previously been read by that process. Therefore, metadata client 44*a* sends a request on path 62 to token client 46*a* at the same node, e.g., node 22*a*. If another client process at that node has obtained the read token for the file, token client 46*a* returns the token to object client 44*a* and access to the file by the potentially competing processes is controlled by the operating system of the node. If token client 46*a* does not have the requested read token, object client 44*a* is so informed via path 64 and metadata client 44*a* requests the token from metadata server (dsvn) 48 via path 66. Metadata server 48 requests the read token from token server 50 via path 68. If the read token is available, it is returned via paths 68 and 66 to metadata client 44*a* which passes the token on to token client 46*a*. If the read token is not available, for example if metadata client 44*c* has a write token, the write token is revoked via paths 70 and 72.

If metadata client 44*a* had wanted a write token in the preceding example, the write token must be returned by metadata client 44*c*. The request for the write token continues from metadata client 44*c* to token client 46*c* via path 74 and is returned via paths 76 and 78 to metadata server 48 which forwards the write token to token server 50 via path 80. Once token server 50 has the write token, it is supplied to metadata client 44*a* via paths 68 and 66 as in the case of the read token described above.

Appropriate control of the tokens for each file by metadata server 48 at node 22*b* enables nodes 22, 24, 26 in the cluster to share all of the files on disk 28 using direct access via Fibre Channel 30, 32. To maximize the speed with which the data is accessed, data on the disk are cached at the nodes as much as possible. Therefore, before returning a write token, the metadata client 44 flushes the write cache to disk. Similarly, if it is necessary to obtain a read token, the read cache is marked invalid and after the read token is obtained, contents of the file are read into the cache.

Mounting of a filesystem as a metadata server is arbitrated by a distributed name service (DNS), such as "white pages" from SGI. A DNS server runs on one of the nodes, e.g., node 22*c*, and each of the other nodes has DNS clients. Subsystems such as the filesystem, when first attempting to mount a filesystem as the metadata server, first attempt to register a filesystem identifier with the distributed name service. If the identifier does not exist, the registration succeeds and the node mounts the filesystem as the server. If the identifier is already registered, the registration fails and the contents of the existing entry for the filesystem identifier are returned, including the node number of the metadata server for the filesystem.

Hierarchical Storage Management

Figure 6:
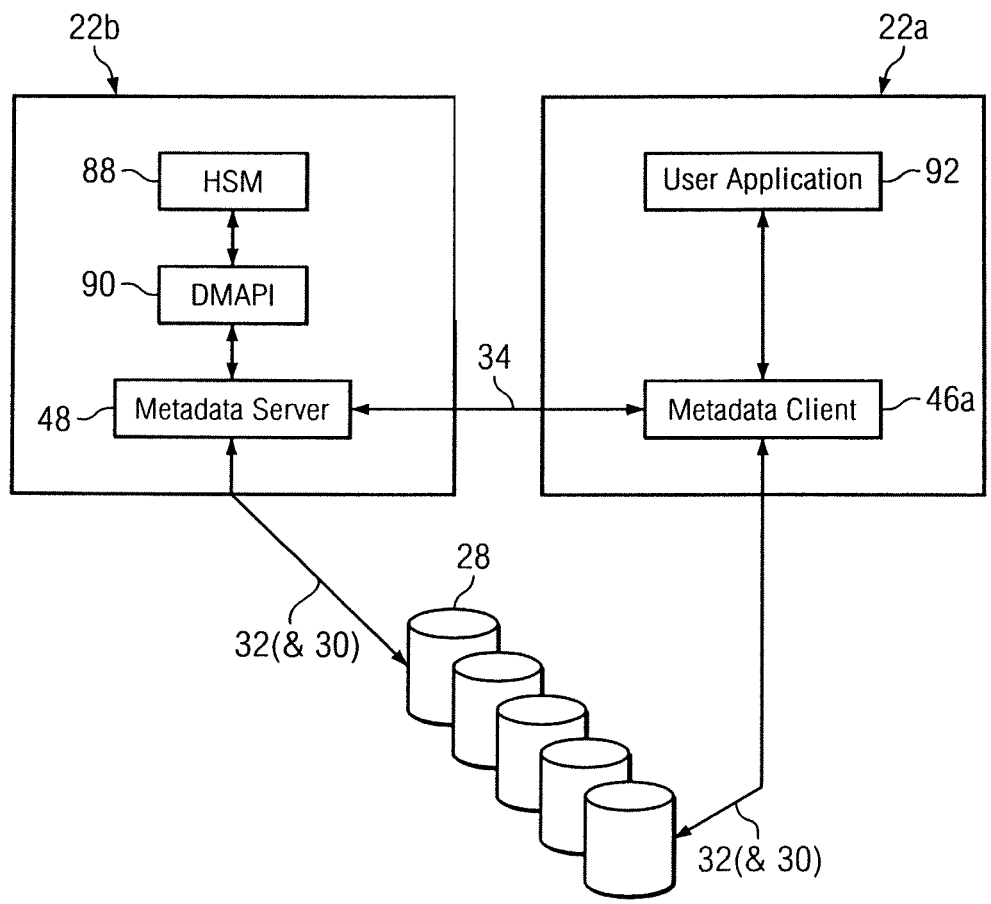
FIG. 6 is a block diagram of integration between a data migration facility server and a client node.

In addition to caching data that is being used by a node, in the preferred embodiment hierarchical storage management (HSM), such as the data migration facility (DMF) from SGI, is used to move data to and from tertiary storage, particularly data that is infrequently used. As illustrated in FIG. 6, process(es) that implement HSM 88 preferably execute on the same node 22*b* as metadata server 48 for the file system(s) under hierarchical storage management. Also residing on node 22*b* are the objects that form DMAPI 90 which interfaces between HSM 88 and metadata server 48.

Figure 7:
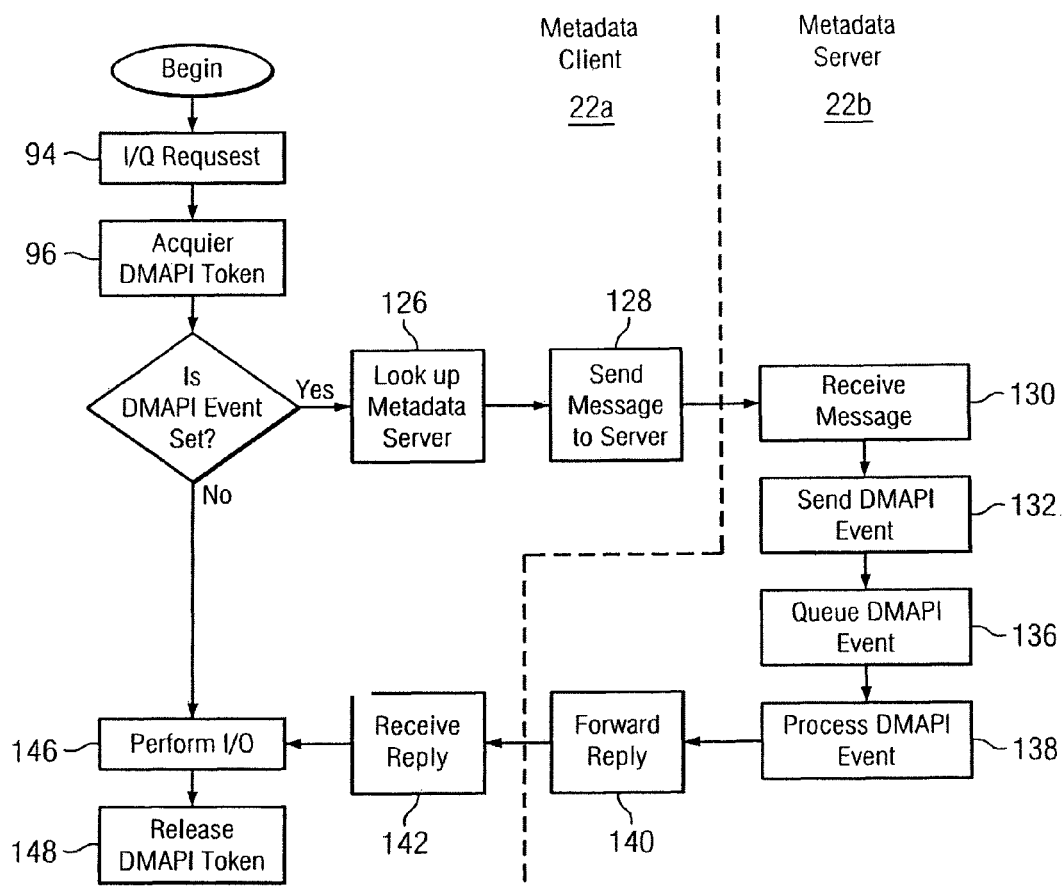
FIGS. 7 and 8 are flowcharts of operations performed to access data under hierarchical storage management.
Figure 8:
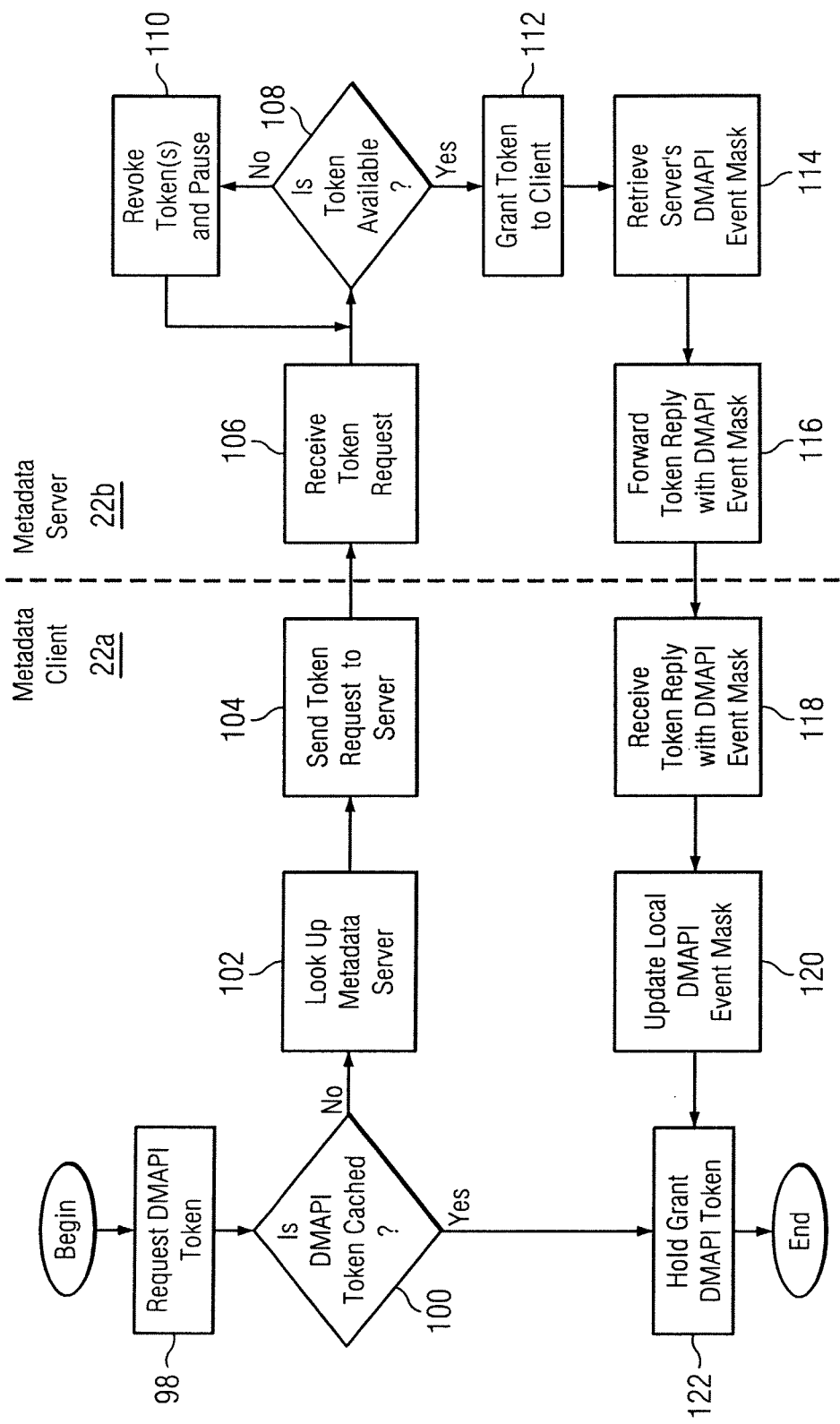

Flowcharts of the operations performed when client node 22*a* requests access to data under hierarchical storage management are provided in FIGS. 7 and 8. When user application 92 (FIG. 6) issues I/O requests 94 (FIG. 7) the DMAPI token must be acquired 96. This operation is illustrated in FIG. 8 where a request for the DMAPI token is issued 98 to metadata client 46*a*. As discussed above with respect to FIG. 5, metadata client 46*a* determines 100 whether the DMAPI token is held at client node 22*a*. If not, a lookup operation on the metadata server 22*b* and the token request is sent. When metadata server 22*b* receives 206 the token request, it is determined 108 whether the token is available. If not, the conflicting tokens are revoked 110 and metadata server 22*b* pauses or goes into a loop until the token can be granted 112. Files under hierarchical storage management have a DMAPI event mask (discussed further below) which is then retrieved 114 and forwarded 116 with the DMAPI token. Metadata client 22*a* receives 118 the token and the DMAPI event mask and updates 120 the local DMAPI event mask. The DMAPI token is then held 222 by token client 46*a*.

As illustrated in FIG. 7, next the DMAPI event mask is checked to determined 124 whether a DMAPI event is set, i.e., to determine whether the file to be accessed is under hierarchical storage management. If so, another lookup 126 of the metadata server is performed as in step 102 so that a message can be sent 128 to the metadata server informing the metadata server 22*b* of the operation to be performed. When server node 22*b* receives 130 the message, metadata server 48 sends 132 notification of the DMAPI event to DMAPI 90 (FIG. 6). The DMAPI event is queued 136 and subsequently processed 138 by DMAPI 90 and HSM 88.

The possible DMAPI events are read, write and truncate. When a read event is queued, the DMAPI server informs the HSM software to ensure that data is available on disks. If necessary, the file requested to be read is transferred from tape to disk. If a write event is set, the HSM software is informed that the tape copy will need to be replaced or updated with the contents written to disk. Similarly, if a truncate event is set, the appropriate change in file size is performed, e.g., by writing the file to disk, adjusting the file size and copying to tape.

Upon completion of the DMAPI event, a reply is forwarded 140 by metadata server 50 to client node 22a which receives 142 the reply and user application 92 performs 146 input/output operations. Upon completion of those operations, the DMAPI token is released 148.

Maintaining System Availability

In addition to high-speed disk access obtained by caching data and shared access to disk drives via a SAN, it is desirable to have high availability of the cluster. This is not easily accomplished with so much data being cached and multiple nodes sharing access to the same data. Several mechanisms are used to increase the availability of the cluster as a whole in the event of failure of one or more of the components or even an entire node, including a metadata server node.

Figure 9:
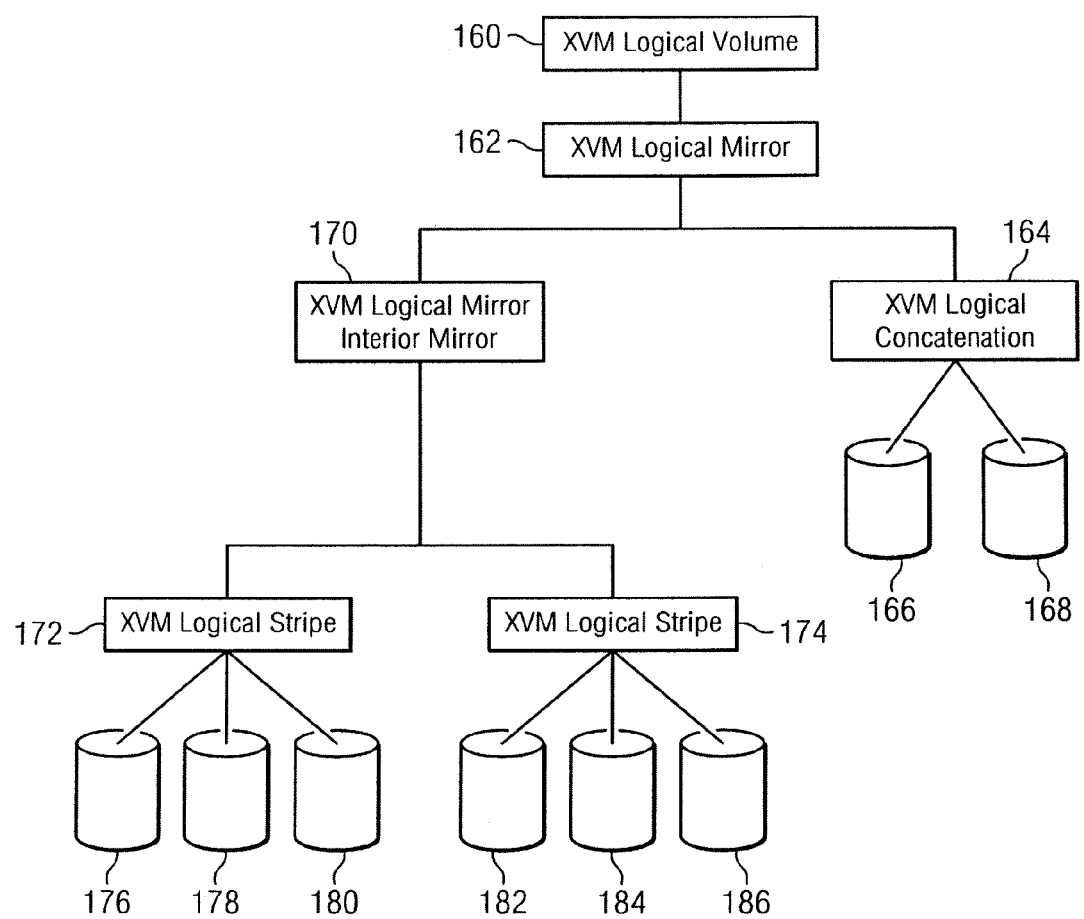
FIG. 9 is a block diagram of a mirrored data volume.

One aspect of the present invention that increases the availability of data is the mirroring of data volumes in mass storage 28. As in the case of conventional mirroring, during normal operation the same data is written to multiple devices. Mirroring may be used in conjunction with striping in which different portions of a data volume are written to different disks to increase speed of access. Disk concatenation can be used to increase the size of a logical volume. Preferably, the volume manager allows any combination of striping, concatenation and mirroring. FIG. 9 provides an example of a volume 160 that has a mirror 162 with a leg 164 that is a concatenation of data on two physical disks 166, 168 and an interior mirror 170 of two legs 172, 174 that are each striped across three disks 176, 178, 180 and 182, 184, 186.

The volume manager may have several servers which operate independently, but are preferably chosen using the same logic. A node is selected from the nodes that have been in the cluster membership the longest and are capable of hosting the server. From that pool of nodes the lowest numbered node is chosen. The volume manager servers are chosen at cluster initialization time or when a server failure occurs. In an exemplary embodiment, there are four volume manager servers, termed boot, config, mirror and pal.

The volume manager exchanges configuration information at cluster initialization time. The boot server receives configuration information from all client nodes. Some of the client nodes could have different connectivity to disks and thus, could have different configurations. The boot server merges the configurations and distributes changes to each client node using a volume manager multicast facility. This facility preferably ensures that updates are made on all nodes in the cluster or none of the nodes using two-phase commit logic. After cluster initialization it is the config server that coordinates changes. The mirror server maintains the mirror specific state information about whether a revive is needed and which mirror legs are consistent.

In a cluster system according to the present invention, all data volumes and their mirrors in mass storage 28 are accessible from any node in the cluster. Each mirror has a node assigned to be its mirror master. The mirror master may be chosen using the same logic as the mirror server with the additional constraint that it must have a physical connection to the disks. During normal operation, queues may be maintained for input/output operations for all of the client nodes by the mirror master to make the legs of the mirror consistent across the cluster. In the event of data loss on one of the disk drives forming mass storage 28, a mirror revive process is initiated by the mirror master, e.g., node 22c (FIG. 2), which detects the failure and is able to execute the mirror revive process.

If a client node, e.g., node 22a, terminates abnormally, the mirror master node 22c will search the mirror input/output queues for outstanding input/output operations from the failed node and remove the outstanding input/output operations from the queues. If a write operation from a failed process to a mirrored volume is in a mirror input/output queue, a mirror revive process is initiated to ensure that mirror consistency is maintained. If the mirror master fails, a new mirror master is selected and the mirror revive process starts at the beginning of the mirror of a damaged data volume and continues to the end of the mirror.

When a mirror revive is in progress, the mirror master coordinates input/output to the mirror. The mirror revive process uses an overlap queue to hold I/O requests from client nodes made during the mirror revive process. Prior to beginning to read from an intact leg of the mirror, the mirror revive process ensures that all other input/output activity to the range of addresses is complete. Any input/output requests made to the address range being revived are refused by the mirror master until all the data in that range of addresses has been written by the mirror revive process.

If there is an I/O request for data in an area that is currently being copied in reconstructing the mirror, the data access is retried after a predetermined time interval without informing the application process which requested the data access. When the mirror master node 22c receives a message that an application wants to do input/output to an area of the mirror that is being revived, the mirror master node 22c will reply that the access can either proceed or that the I/O request overlaps an area being revived. In the latter case, the client node will enter a loop in which the access is retried periodically until it is successful, without the application process being aware that this is occurring.

Input/output access to the mirror continues during the mirror revive process with the volume manager process keeping track of the first unsynchronized block of data to avoid unnecessary communication between client and server. The client node receives the revive status and can check to see if it has an I/O request preceding the area being synchronized. If the I/O request precedes that area, the I/O request will be processed as if there was no mirror revive in progress.

Data read from unreconstructed portions of the mirror by applications are preferably written to the copy being reconstructed, to avoid an additional read at a later period in time. The mirror revive process keeps track of what blocks have been written in this manner. New data written by applications in the portion of the mirror that already have been copied by the mirror revive process are mirrored using conventional mirroring. If an interior mirror is present, it is placed in writeback mode. When the outer revive causes reads to the interior mirror, it will automatically write to all legs of the interior mirror, thus synchronizing the interior mirror at the same time.

Snapshot Copying of Volumes

Figure 15:
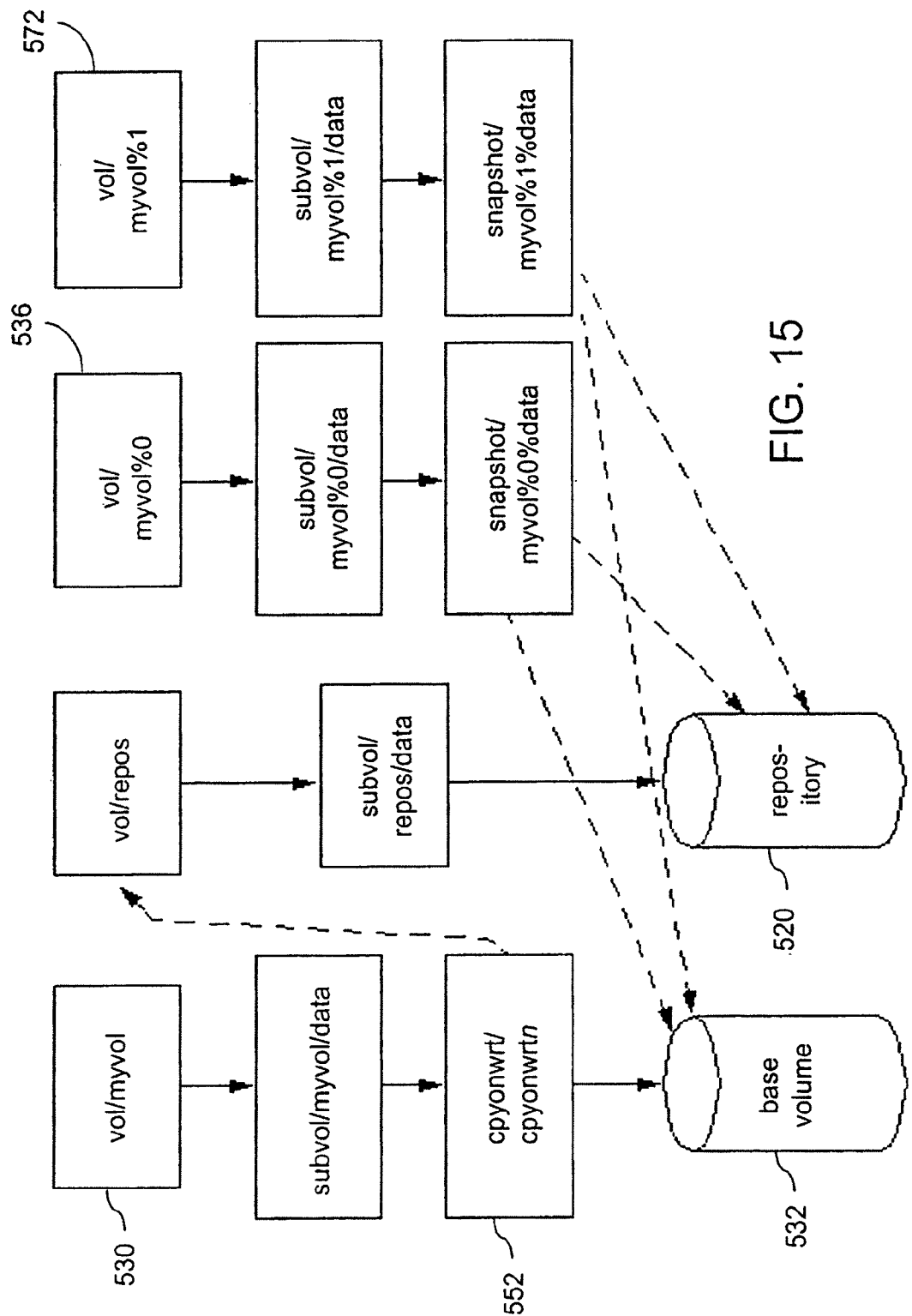
FIG. 15 is a block diagram of a filesystem and a repository for a snapshot of a data volume in the file system.
Figure 16:
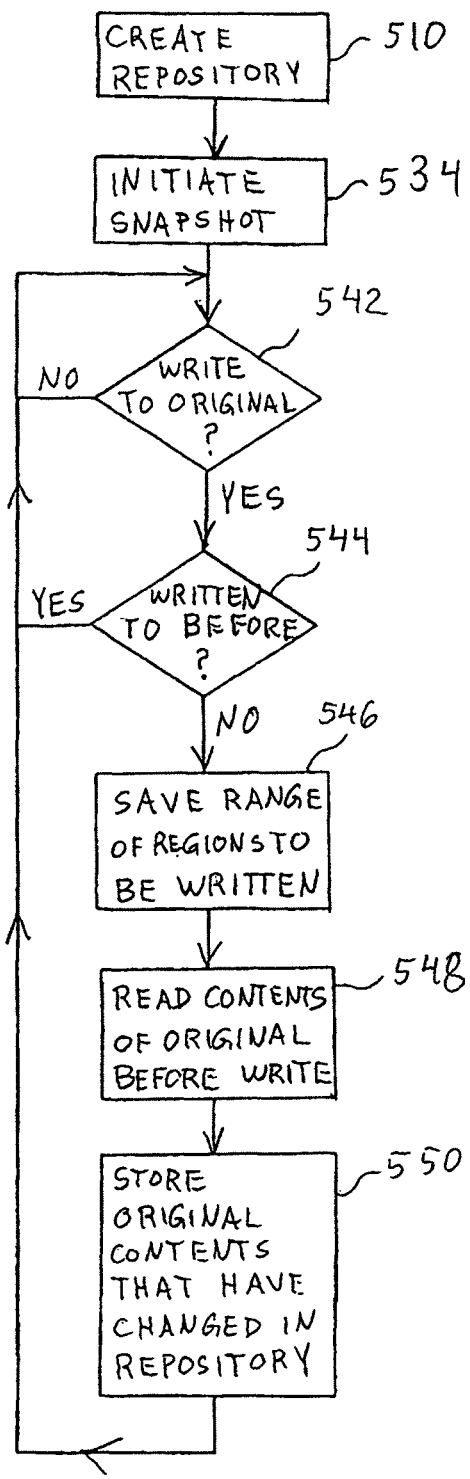
FIG. 16 is a flowchart of the process of creating a snapshot of a data volume.
Figure 17:
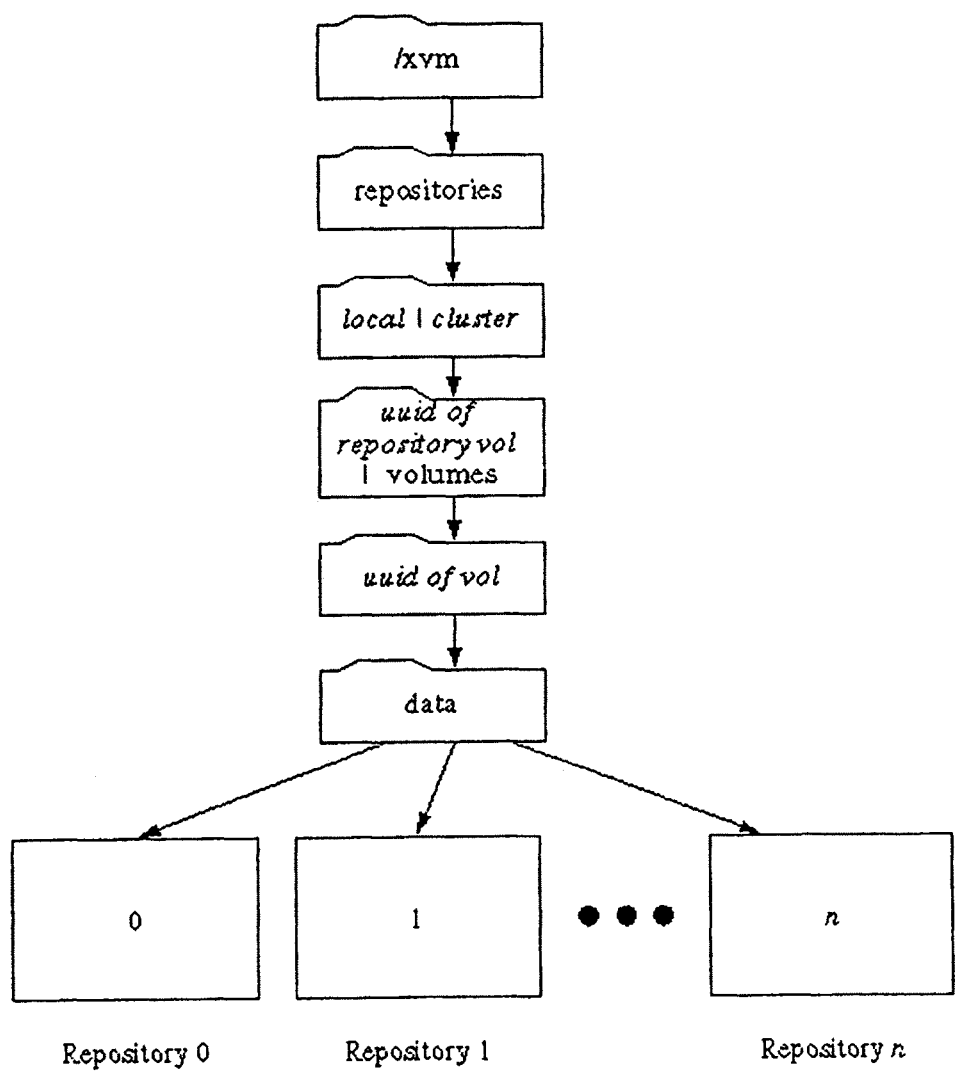
FIG. 17 is a block diagram of a repository filesystem structure.

In addition to maintaining consistency of mirrors, it is desirable to be able to create a "snapshot" of a data volume, i.e., a copy of the data volume contents at a point in time. Such capability is desirable for both clusters and stand-alone systems. A block diagram of a filesystem and a repository which will hold the snapshot of the data volume is illustrated in FIG. 15. A flowchart of the process of creating a snapshot is illustrated in FIG. 16. As illustrated in FIG. 16, the first step in creating a snapshot is to create 510 a repository 520 (FIG. 15) having the file structure illustrated in FIG. 17. The repository 520 will be used to store a snapshot of a data volume 530 in filesystem 532. In an embodiment, repository 520 is itself a filesystem under XFS, CXFS, or similar software and each snapshot volume corresponds to a file in the filesystem, as indicated by the use of "uuid" in FIG. 17. This allows the capabilities of the filesystem software to be used in creating and maintaining snapshots.

Once the repository volume 520 has been created 510, the snapshot process is initiated 534 to create a snapshot volume 536 (FIG. 15). One step in initiating the snapshot process is to create a modified region map in which a single bit represents each region in the original or base volume 532, where the size of each region for a particular snapshot volume preferably may be modified by users, system administrators, or when the system is configured. For example, in an embodiment using XFS, a region may correspond to an "extent" defined by the starting offset in the file, the starting filesystem block, the number of blocks of the extent and a flag indicating whether any blocks in the extent have been written. When the snapshot volume 536 is created, all the bits in the modified-region map have an initial value such as zero. As discussed below in more detail, when any data within a region is changed, the corresponding bit in the modified region map is set (e.g., to one) for that region. In an embodiment using IRIX and XFS, if system 22a (FIG. 2) maintaining repository 520 is reinitialized (rebooted), the modified region map is rebuilt using the function F_GETBMAPX in XFS to determine if bits should be set corresponding to regions for which the writing operation was completed prior to interruption of operations on system 22a.

Once the snapshot has been initiated, the volume manager, such as XVM, monitors all write operations to the original or base filesystem. When a write to the base volume 530 (original) is detected 542, the modified region map is referenced to determine 544 whether the region(s) in the original containing the data block(s) to be written has been changed since the snapshot was initiated. If so, the write operation may proceed. If not, the region(s) in the base volume 530 that will be modified by the write operation are identified 546 by a flag, or some other indication that a snapshot is being kept of the contents in the region(s) as of the point in time that the snapshot was initiated. Prior to performing the write operation to region(s) of data for the first time after initiation of a snapshot, the contents of the region(s) in the original or base volume 530 are read 548 and stored 550 in the repository 520 by "cpyonwrt" process 552 (FIG. 15).

In an embodiment using XFS, the function F_SETLKW (set file lock) is preferably used to coordinate the copying of data to repository 520 from base volume 532. A portion of the repository file corresponding to the region to be copied in base volume 532 is locked. Then, data is read 548 from base volume 532 and written 550 to the snapshot file in repository 520. Only after the write is complete is the flag for the region changed from unwritten to written. If the system is shut down or crashes during the copying operation, the unwritten labeling of the region remains unchanged. This prevents the region from being mistakenly considered as having been copied. Thus, the integrity of the snapshot is guaranteed.

Figure 18:
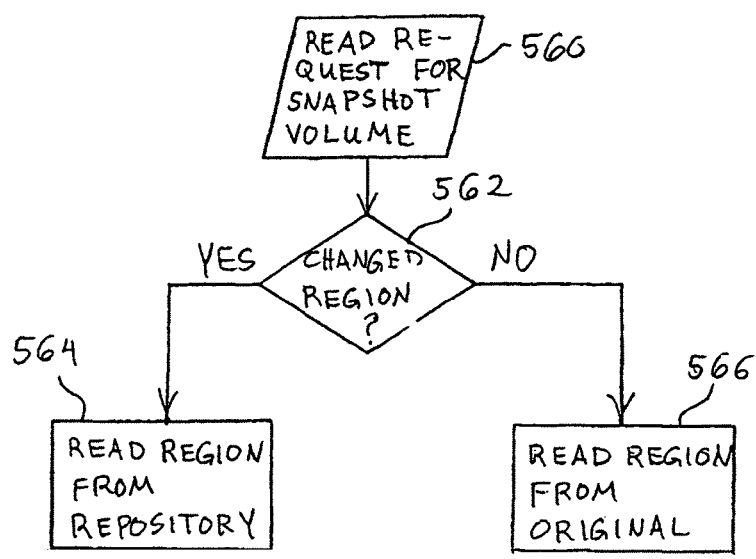
FIG. 18 is a flow chart of a read operation of a snapshot volume.

One purpose of a snapshot is to retain the contents of data at a point in time. When used for this purpose, write operations are not permitted to a repository for a snapshot volume, except to preserve the contents of the original or base volume 530 that have changed, using the process described above. On the other hand, read operations may be performed on a snapshot volume using the process illustrated in FIG. 18. When a read request is received 560 for a snapshot volume, it is determined 562 whether the read request includes a region that has changed in the base volume 530 since the snapshot was initiated. All regions that have changed are read 564 from the snapshot volume in the repository 520. All regions that have not changed are read 566 from the original or base volume 530.

When a snapshot volume is retained over a long period of time relative to the rate of change of the base volume 530, the amount of space required by the snapshot volume will increase. Preferably, space is dynamically allocated to the repository 520 to increase the space required by the snapshot volumes, using any conventional technique. For example, in an embodiment using XFS, the function F_RESVSP function may be used to preallocate space for a region in a repository.

Figure 19:
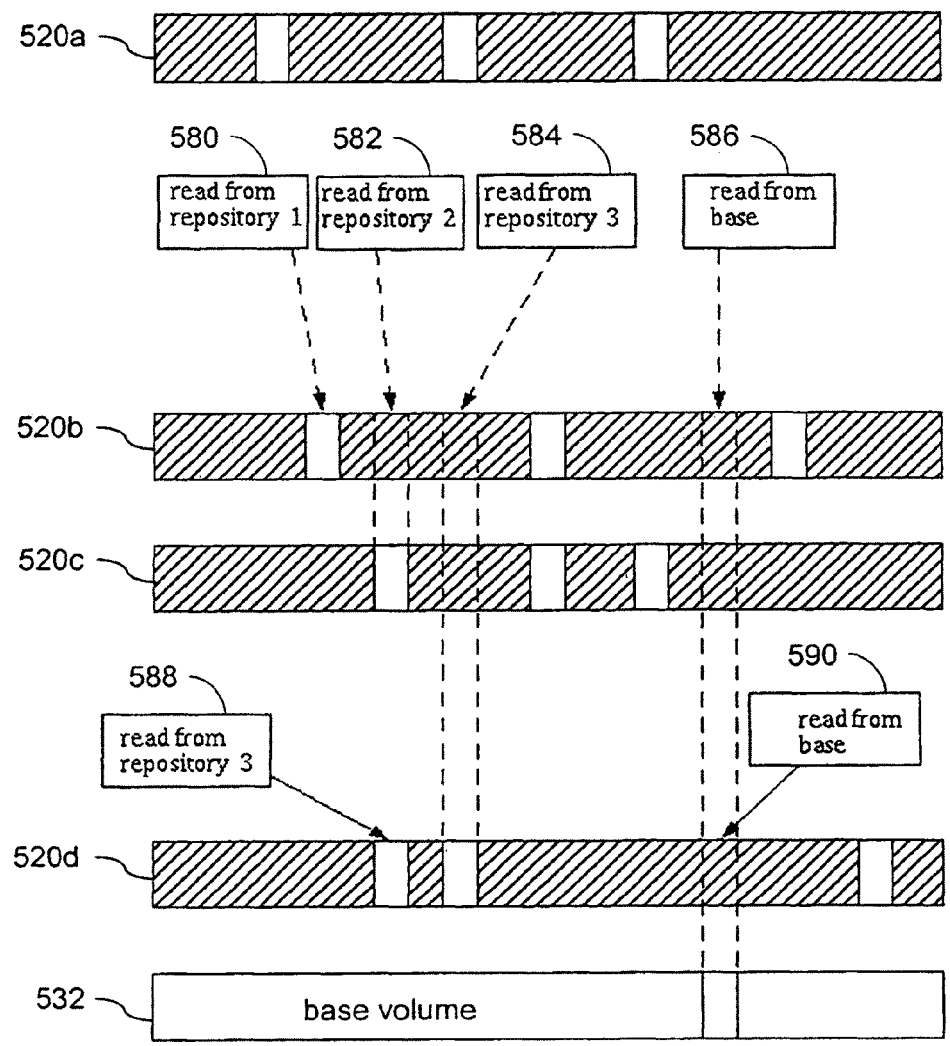
FIG. 19 is a schematic diagram of a base volume and multiple snapshot volumes for illustration of read operations.
Figure 20:
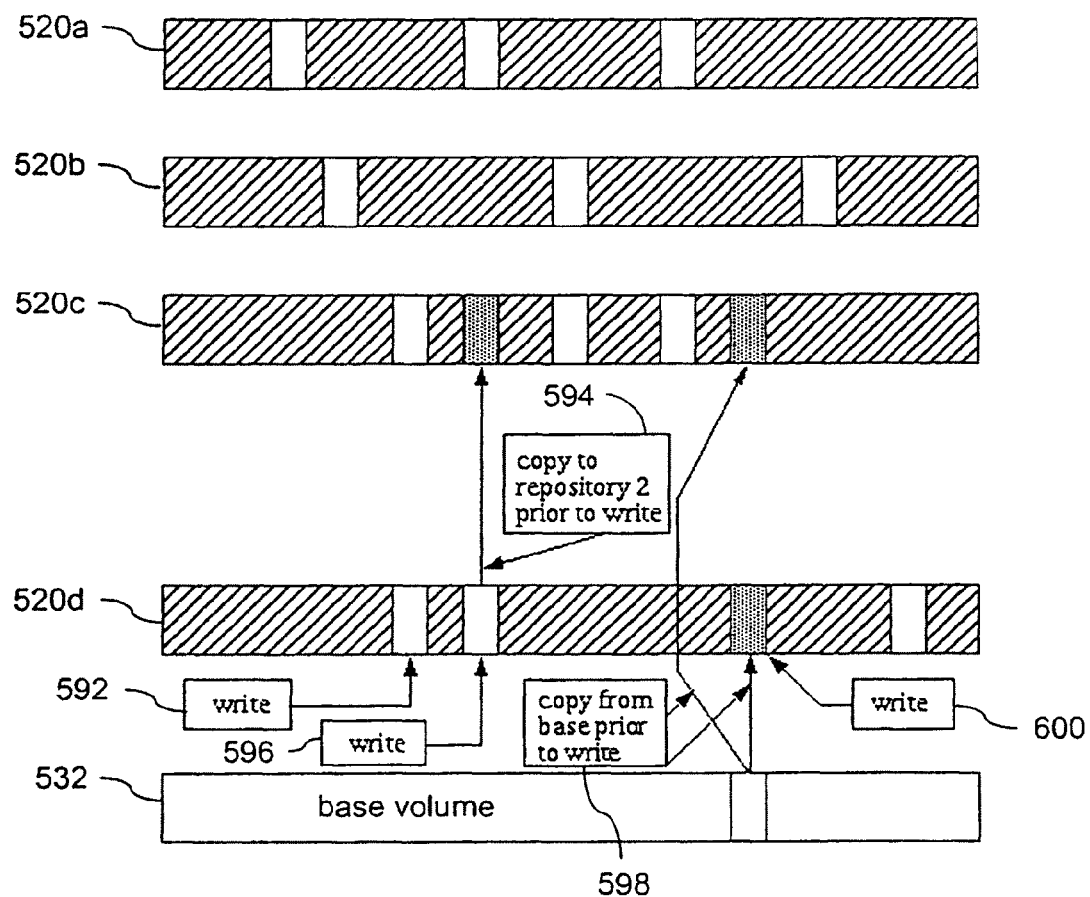
FIG. 20 is a schematic diagram of a base volume and multiple snapshot volumes for illustration of write operations to a snapshot volume.

Multiple snapshots may be initiated for the same base volume 530, as indicated by second snapshot volume initiation process 572 in FIG. 15 and as illustrated in FIGS. 19 and 20. When a write operation is detected 542 to a base volume 530 having multiple snapshots, it is determined 544 whether the region has been changed since the most recent snapshot was initiated. This is accomplished by checking the modified region map which is reset when a more recent snapshot is initiated, to indicate that no regions have been copied.

In the preferred embodiment, when reading 560 a region from a snapshot volume corresponding to a base volume 530 that has multiple snapshots, it is necessary to locate the region that existed at the time that snapshot was initiated. When repository 520 is implemented as a filesystem in which space is allocated in blocks that are initially flagged as unwritten, it can be determined 562 whether a region has been changed by reading the flag. Similarly, if the filesystem allocates space dynamically, the response to a read request of unallocated space in repository 520 would indicate that the corresponding region has not changed in the base volume. For example, if repository 520 is an XFS filesystem, determination 562 may be made using the F_GETBMAPX function call in XFS to determine if a region exists on a repository file and the "unwritten extent" flag has been cleared. First, the repository corresponding to the snapshot volume being read is checked. If the region has not been written to that snapshot volume, each of the repository files storing snapshot volumes newer than the snapshot volume being read are checked (ending with the newest snapshot volume). If the region has been written to none of the newer snapshot volumes, the base volume 530 is read 566.

Examples of reading from multiple snapshot volumes 520a-520d of the same base volume 532 are illustrated in FIG. 19. Read operation 580 from the snapshot volume corresponding to repository 520b obtains the region from repository 520b when the region had been written to repository 520b. Read operations 582, 584 of other regions that had not been written to the snapshot volume corresponding to repository 520b obtain the region from newer repositories 520c and 520d. Read operation 586 of a region that had not been written to any of the snapshot volumes corresponding to repositories 520a-520d obtains the region from base volume 532. In the case of read operations 588 and 590 from the most recent snapshot volume corresponding to repository 520d, there are only two possibilities, a read 588 from repository 520d or a read 590 from base volume 532.

In an alternative embodiment, writing directly to a snapshot volume is permitted, e.g., where the snapshot volume contains an earlier version of software that has been patched and the snapshot volume is maintained with the patches included. In this case, operations are performed to ensure that an older snapshot of the base volume has a copy of the region being written. Examples are illustrated in FIG. 20 for write operations to the snapshot volume corresponding to repository 520d. If the repository 520c for the next newest snapshot volume already has a copy of the region being written there is only a write operation 592 to repository 520*d*. If the region to be written was previously written to repository 520*d*, but not repository 520*c*, the existing contents of the region are copied 594 prior to writing 596 to repository 520*d*. If the region to be written was not previously written to either repository 520*d* or repository 520*c*, the region is copied 598 from base volume 530 to repositories 520*c* and 520*d* prior to writing 600 to repository 520*d*.

Base volume 530 may have several files stored thereon. Deletion of one of these files has no immediate effect on the contents of the files which remain on the base volume. However, as data in base volume 530 previously part of the deleted file is overwritten, the (newest) snapshot 536 will be updated with the data that is overwritten. Thus, snapshots provide a mechanism for backing up deleted files, until the snapshot process is terminated for base volume 530.

Recovery and Relocation

Figure 10:
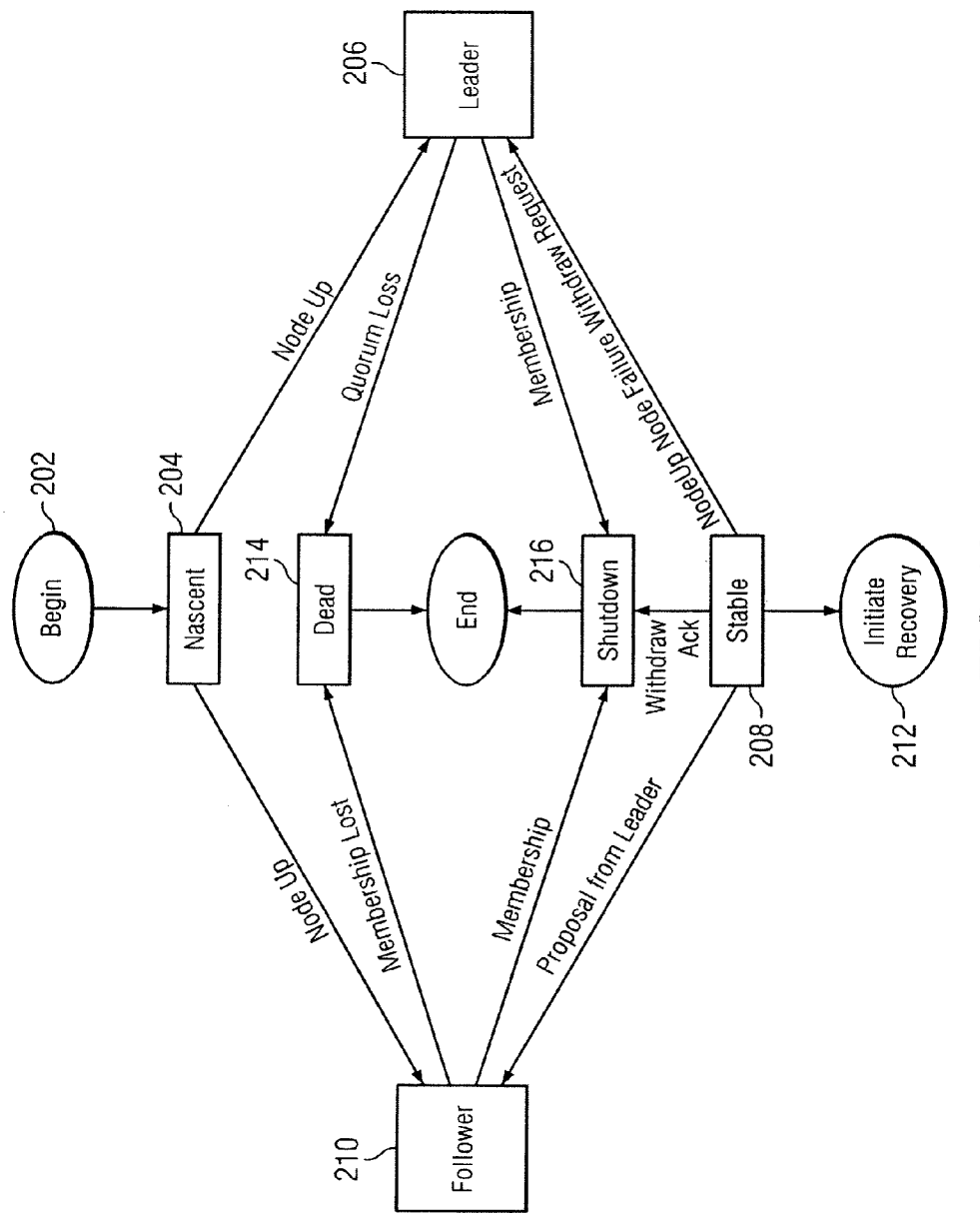
FIG. 10 is a state machine diagram of cluster membership.

In the preferred embodiment, a common object recovery protocol (CORPSE) is used for server endurance. As illustrated in FIG. 10, if a node executing a metadata server fails, the remaining nodes will become aware of the failure from loss of heartbeat, error in messaging or by delivery of a new cluster membership excluding the failed node. The first step in recovery or initiation of a cluster is to determine the membership and roles of the nodes in the cluster. If the heartbeat signal is lost from a node or a new node is detected in the cluster, a new membership must be determined. To enable a computer system to access a cluster filesystem, it must first be defined as a member of the cluster, i.e., a node, in that filesystem.

As illustrated in FIG. 10, when a node begins 202 operation, it enters a nascent state 204 in which it detects the heartbeat signals from other nodes and begins transmitting its own heartbeat signal. When enough heartbeat signals are detected to indicate that there are sufficient operating nodes to form a viable cluster, requests are sent for information regarding whether there is an existing membership for the cluster. If there is an existing leader for the cluster, the request(s) will be sent to the node in the leader state 206. If there is no existing leader, conventional techniques are used to elect a leader and that node transitions to the leader state 206. For example, a leader may be selected that has been a member of the cluster for the longest period of time and is capable of being a metadata server.

The node in the leader state 206 sends out messages to all of the other nodes that it has identified and requests information from each of those nodes about the nodes to which they are connected. Upon receipt of these messages, nodes in the nascent state 204 and stable state 208 transition to the follower state 210. The information received in response to these requests is accumulated by the node in the leader state 206 to identify the largest set of fully connected nodes for a proposed membership. Identifying information for the nodes in the proposed membership is then transmitted to all of the nodes in the proposed membership. Once all nodes accept the membership proposed by the node in the leader state 206, all of the nodes in the membership transition to the stable state 208 and recovery is initiated 212 if the change in membership was due to a node failure. If the node in the leader state 206 is unable to find sufficient operating nodes to form a cluster, i.e., a quorum, all of the nodes transition to a dead state 214.

If a node is deactivated in an orderly fashion, the node sends a withdrawal request to the other nodes in the cluster, causing one of the nodes to transition to the leader state 206. As in the case described above, the node in the leader state 206 sends a message with a proposed membership causing the other nodes to transition to the follower state 210. If a new membership is established, the node in the leader state 206 sends an acknowledgement to the node that requested withdrawal from membership and that node transitions to a shutdown state 216, while the remaining nodes transition to the stable state 208.

Figure 11:
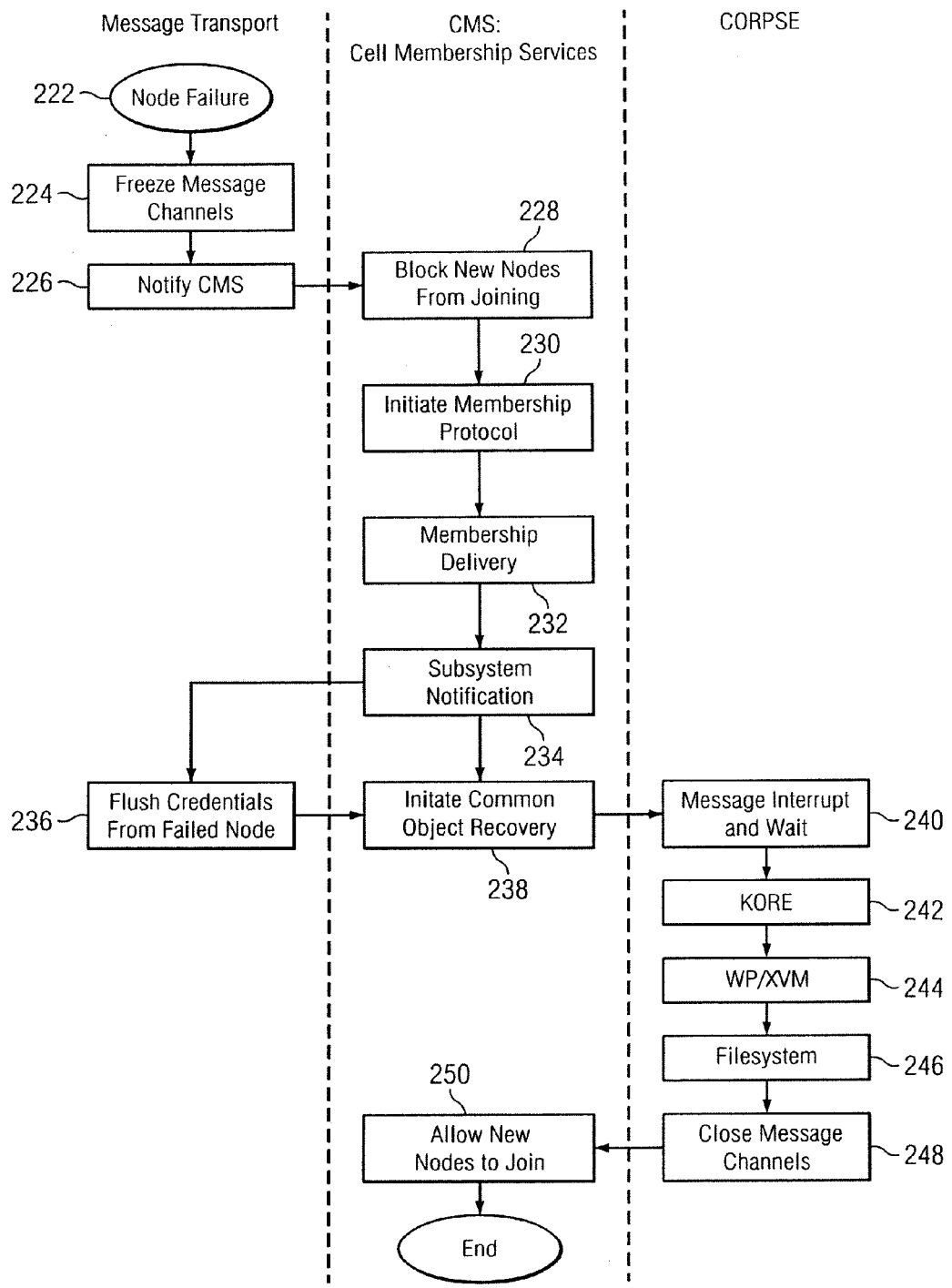
FIG. 11 is a flowchart of a process for recovering from the loss of a node.

In the stable state 208, message channels are established between the nodes 22, 24, 26 over LAN 34. A message transport layer in the operating system handles the transmission and receipt of messages over the message channels. One set of message channels is used for general messages, such as token requests and metadata. Another set of channels is used just for membership. If it is necessary to initiate recovery 212, the steps illustrated in FIG. 11 are performed. Upon detection of a node failure 222, by loss of heartbeat or messaging failure, the message transport layer in the node detecting the failure freezes 224 the general message channels between that node and the failed node and disconnects the membership channels. The message transport layer then notifies 226 the cell membership services (CMS) daemon.

Upon notification of a node failure, the CMS daemon blocks 228 new nodes from joining the membership and initiates 230 the membership protocol represented by the state machine diagram in FIG. 10. A leader is selected and the process of membership delivery 232 is performed as discussed above with respect to FIG. 10.

In the preferred embodiment, CMS includes support for nodes to operate under different versions of the operating system, so that it is not necessary to upgrade all of the nodes at once. Instead, a rolling upgrade is used in which a node is withdrawn from the cluster, the new software is installed and the node is added back to the cluster. The time period between upgrades may be fairly long, if the people responsible for operating the cluster want to gain some experience using the new software.

Version tags and levels are preferably registered by the various subsystems to indicate version levels for various functions within the subsystem. These tags and levels are transmitted from follower nodes to the CMS leader node during the membership protocol 230 when joining the cluster. The information is aggregated by the CMS leader node and membership delivery 232 includes the version tags and levels for any new node in the cluster. As a result all nodes in the know the version levels of functions on other nodes before any contact between them is possible so they can properly format messages or execute distributed algorithms.

Upon initiation 212 of recovery, the following steps are performed. The first step in recovery involves the credential service subsystem. The credential subsystem caches information about other nodes, so that each service request doesn't have to contain a whole set of credentials. As the first step of recovery, the CMS daemon notifies 234 the credential subsystem in each of the nodes to flush 236 the credentials from the failed node.

When the CMS daemon receives acknowledgment that the credentials have been flushed, common object recovery is initiated 238. Details of the common object recovery protocol for server endurance (CORPSE) will be described below with respect to FIG. 12. An overview of the CORPSE process is illustrated in FIG. 11, beginning with the interrupting 240 of messages from the failed node and waiting for processing of these messages to complete. Messages whose service includes a potentially unbounded wait time are returned with an error.

After all of the messages from the failed node have been processed, CORPSE recovers the system in three passes starting with the lowest layer (cluster infrastructure) and ending with the file system. In the first pass, recovery of the kernel object relocation engine (KORE) is executed 242 for any in-progress object relocation involving a failed node. In the second pass, the distributed name server (white pages) and the volume manager, such as XVM, are recovered 244 making these services available for filesystem recovery. In the third pass the file system is recovered 246 to return all files to a stable state based on information available from the remaining nodes. Upon completion of the third pass, the message channels are closed 248 and new nodes are allowed 250 to join.

Figure 12:
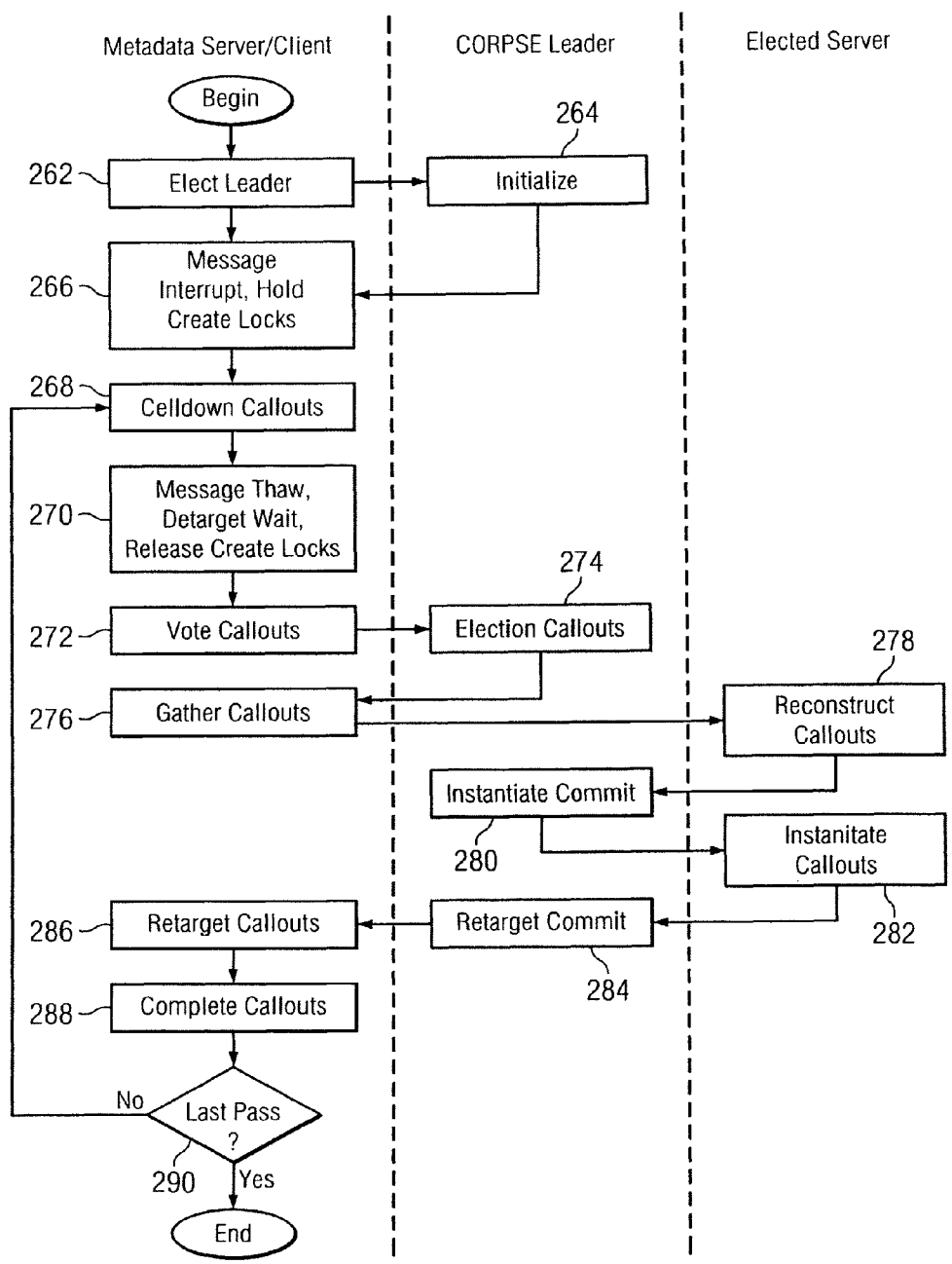
FIG. 12 is a flowchart of a common object recovery protocol.

As illustrated in FIG. 12, the first step in CORPSE is to elect 262 a leader for the purposes of recovery. The CORPSE leader is elected using the same algorithm as described above with respect to the membership leader 206. In the event of another failure before recovery is completed, a new leader is elected 262. The node selected as the CORPSE leader initializes 264 the CORPSE process to request the metadata client processes on all of the nodes to begin celldown callouts as described below. The purpose of initialization is to handle situations in which another node failure is discovered before a pass is completed. First, the metadata server(s) and clients initiate 266 message interrupts and holds all create locks.

The next step to be performed includes detargeting a chandle. A chandle or client handle is a combination of a barrier lock, some state information and an object pointer that is partially subsystem specific. A chandle includes a node identifier for where the metadata server can be found and a field that the subsystem defines which tells the chandle how to locate the metadata server on that node, e.g., using a hash address or an actual memory address on the node. Also stored in the chandle is a service identifier indicating whether the chandle is part of the filesystem, vnode file, or distributed name service and a multi-reader barrier lock that protects all of this. When a node wants to send a message to a metadata server, it acquires a hold on the multi-reader barrier lock and once that takes hold the service information is decoded to determine where to send the message and the message is created with the pointer to the object to be executed once the message reaches the metadata server.

With messages interrupted and create locks held, celldown callouts are performed 268 to load object information into a manifest object and detarget the chandles associated with the objects put into the manifest. By detargeting a chandle, any new access on the associated object is prevented. The create locks are previously held 266 on the objects needed for recovery to ensure that the objects are not instantiated for continued processing on a client node in response to a remote processing call (RPC) previously initiated on a failed metadata server. An RPC is a thread initiated on a node in response to a message from another node to act as a proxy for the requesting node. In the preferred embodiment, RPCs are used to acquire (or recall) tokens for the requesting node. During celldown callouts 268 the metadata server recovers from any lost clients, returning any tokens the client(s) held and purging any state held on behalf of the client.

The CORPSE subsystems executing on the metadata clients go through all of the objects involved in recovery and determine whether the server for that client object is in the membership for the cluster. One way of making this determination is to examine the service value in the chandle for that client object, where the service value contains a subsystem identifier and a server node identifier. Object handles which identify the subsystems and subsystem specific recovery data necessary to carry out further callouts are placed in the manifest. Server nodes recover from client failure during celldown callouts by returning failed client tokens and purging any state associated with the client.

When celldown callouts have been performed 268 for all of the objects associated with a failed node, the operations frozen 266 previously are thawed or released 270. The message channel is thawed 270, so that any threads that are waiting for responses can receive error messages that a cell is down, i.e., a node has failed, so that that the threads can do any necessary cleanup and then drop the chandle hold. This allows all of the detargets to be completed. In addition, the create locks are released 270. The final result of the operations performed in step 270 is that all client objects associated with the filesystem are quiesced, so that no further RPCs will be sent or are awaiting receipt.

After the celldown callouts 268 have processed the information about the failed node(s), vote callouts are performed 272 in each of the remaining nodes to elect a new server. The votes are sent to the CORPSE leader which executes 274 election callouts to identify the node(s) that will host the new servers. The election algorithm used is subsystem specific. The filesystem selects the next surviving node listed as a possible server for the filesystem, while the DNS selects the oldest server capable node.

When all of the nodes are notified of the results of the election, gather callouts are performed 276 on the client nodes to create manifests for each server on the failed node(s). Each manifest contains information about one of the servers and is sent to the node elected to host that server after recovery. A table of contents of the information in the bag is included in each manifest, so that reconstruct callouts can be performed 278 on each object and each manifest from each of the nodes.

The reconstruct callouts 278 are executed on the new elected server to extract information from the manifests received from all the nodes while the chandles are detargeted, so that none of the nodes attempt to access the elected server. When the reconstruct callouts 278 are completed, a message is sent to the CORPSE leader that it is ready to commit 280 to instantiate the objects of the server. The instantiate callouts are then performed 282 and upon instantiation of all of the objects, a commitment 284 is sent to the CORPSE leader for retargeting the chandles to the elected server. The instantiate commit 280 and retarget commit 284 are performed by the CORPSE leader, to save information regarding the extent of recovery, in case there is another node failure prior to completion of a pass. If a failure occurs prior to instantiate commit 280, the pass is aborted and recovery is restarted with freezing 224 of message channels. However, once the CORPSE leader notifies any node to go forward with instantiating 282 new server(s), recovery of any new node failure is delayed until the current pass completes, then recovery rolls back to freezing 224 message channels. If the failed node contains the elected server, the client nodes are targeted to the now-failed server and the process of recovering the server begins again.

In the case of the second pass, WP/XVM 244, a single chandle accesses the DNS server and the manifest created at each client node contains all of the file identifiers in use at that node prior to entering recovery. During the reconstruct callouts 278 of the second pass, the DNS server goes through all of the entries in the manifest and creates a unique entry for each filesystem identifier it receives. If duplicate entries arrive, which is likely since many nodes may have the entry for a single filesystem, tokens are allocated for the sending node in the previously created entry.

After all of the retargets are performed 286 in each of the nodes, a complete callout is performed 288 by the subsystem being recovered to do any work that is required at that point. Examples are deallocating memory used during recovery or purging any lingering state associated with a failed node, including removing DNS entries still referencing a failed node. As discussed above with respect to FIG. 11, the steps illustrated in FIG. 12 are preferably repeated in three passes as different subsystems of the operating system are recovered. After completion 290 of the last pass, CORPSE is completed.

Kernel Object Relocation Engine

As noted above, the first pass 242 of recovery is to recover from an incomplete relocation of a metadata server. The kernel object relocation engine (KORE) is used for an intentional relocation of the metadata server, e.g. for an unmount of the server or to completely shutdown a node at which a metadata server is located, to return the metadata server to a previously failed node, or for load shifting. Provided no nodes fail, during relocation an object manifest can be easily created, since all of the information required for the new, i.e., target, metadata server can be obtained from the existing, i.e., source, metadata server.

Figure 13:
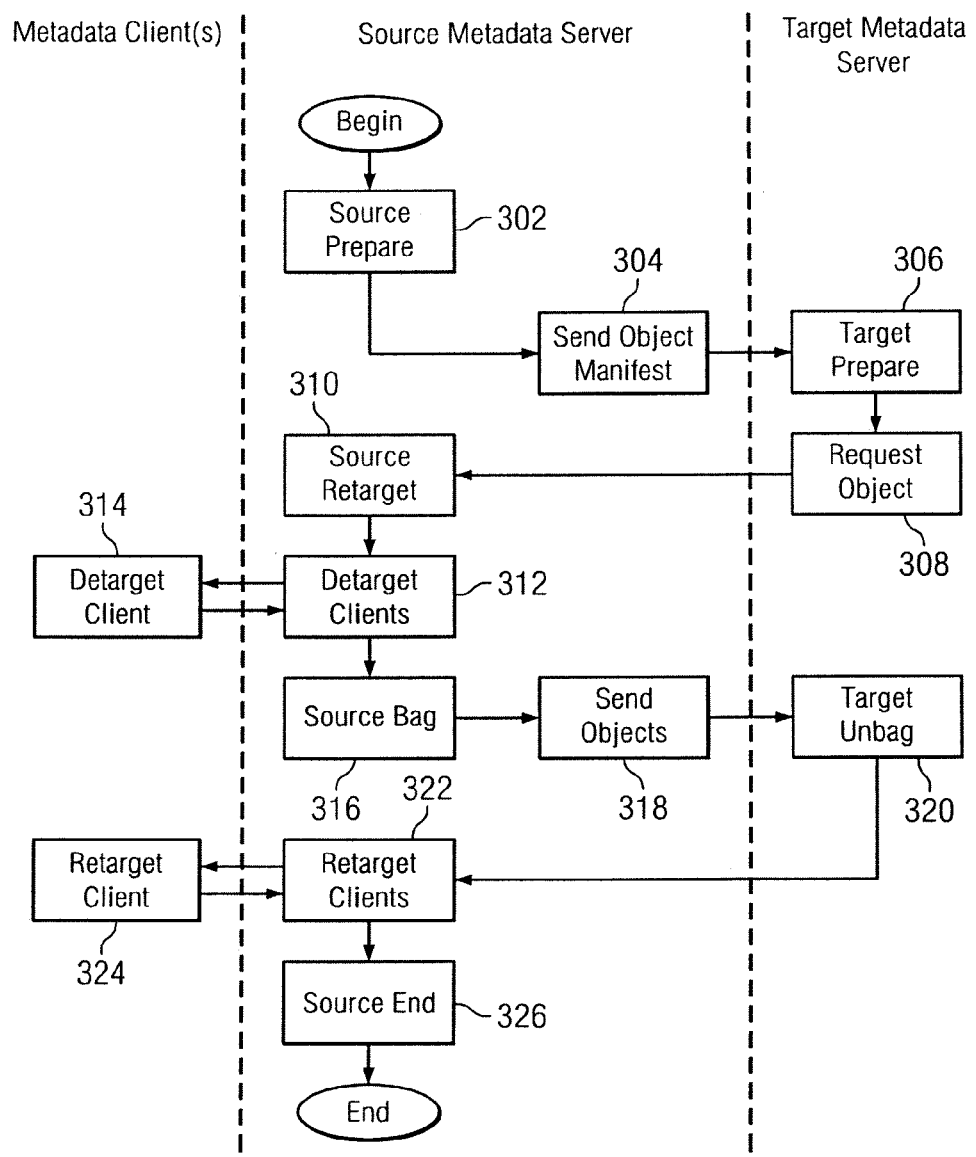
FIG. 13 a flowchart of a kernel object relocation engine.

As illustrated in FIG. 13, KORE begins with source node prepare phase 302, which ensures that filesystem is quiesced before starting the relocation. When all of the objects of the metadata server are quiesced, they are collected into an object manifest and sent 304 to the target metadata server. Most of the steps performed by the target metadata server are performed in both relocation and recovery. The target node is prepared 306 and an object request is sent 308 from the target metadata server to the source metadata server to obtain a bag containing the state of the object being relocated.

In response, the source metadata server initiates 310 retargeting and creation of client structures (objects) for the vnodes and the vfs, then all clients are informed 312 to detarget 314 that node as the metadata server. When the source metadata server has been informed that all of the clients have completed detargeting 314, a source bag is generated 316 with all of the tokens and the state of server objects which are sent 318 to the target metadata server. The target metadata server unbags 320 the objects and initiates execution of the metadata server. The target metadata server informs the source metadata server to inform 322 the clients to retarget 324 the target metadata server and processing resumes on the target metadata server. The source metadata server is informed when each of the clients completes retargeting 324, so that the source node can end 326 operation as the metadata server.

Figure 14A:
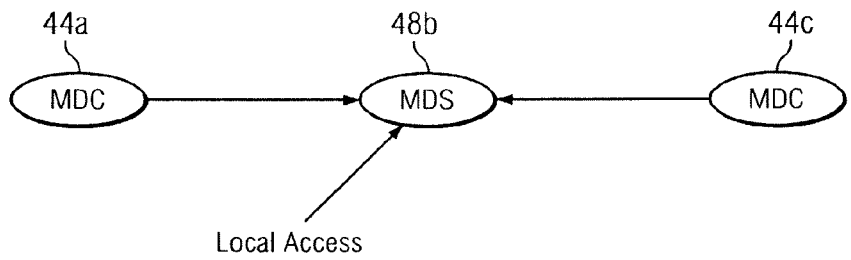
FIGS. 14A-14H are a sequence of state machine diagrams of server relocation.
Figure 14B:
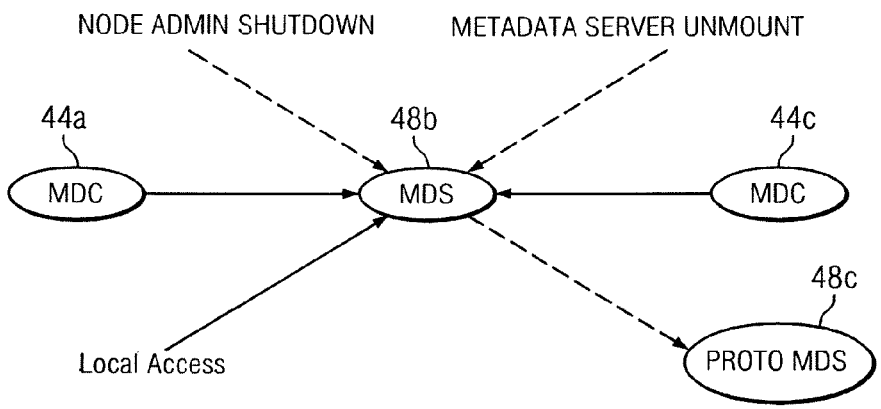
Figure 14C:
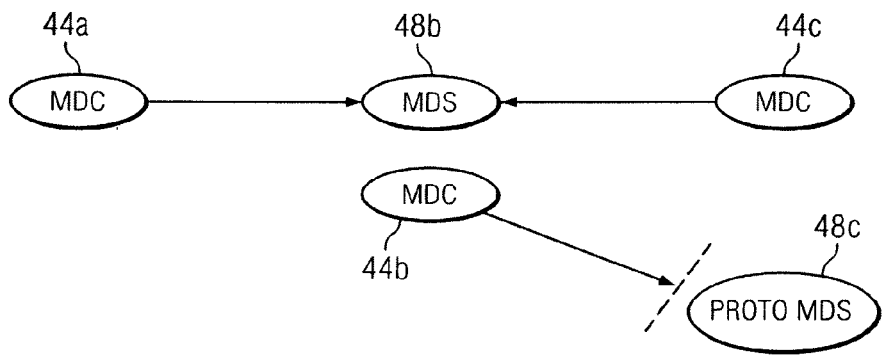
Figure 14D:
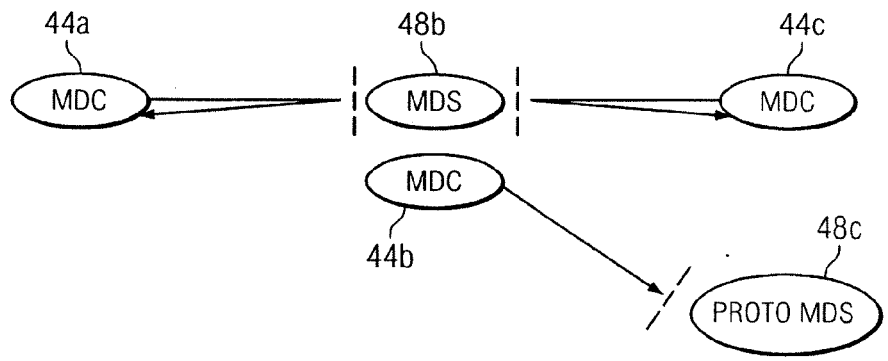
Figure 14E:
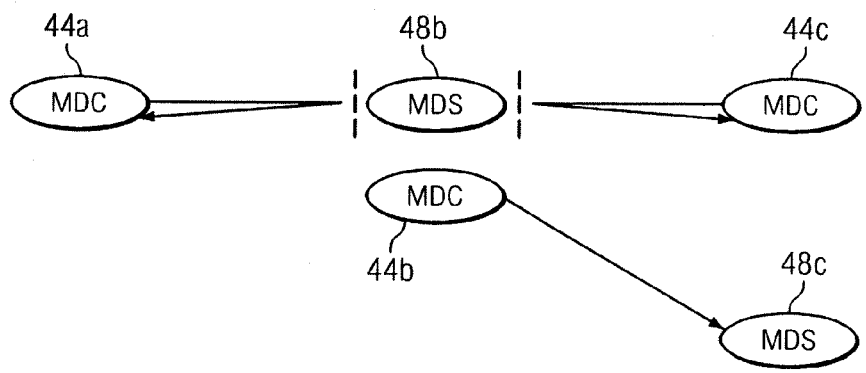
Figure 14F:
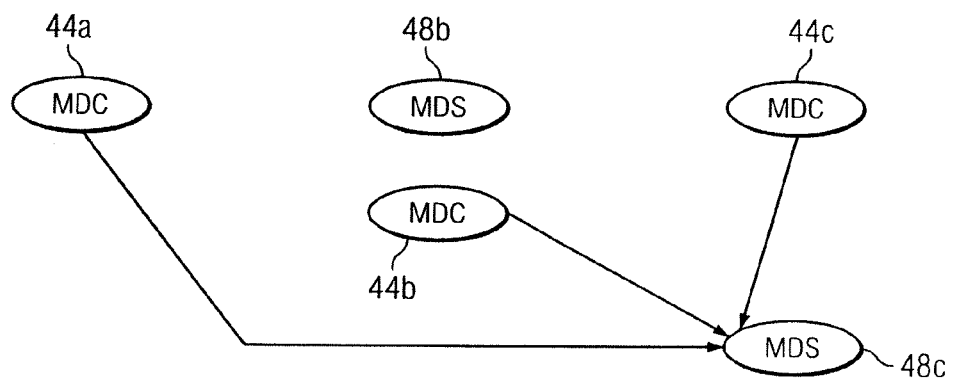
Figure 14G:
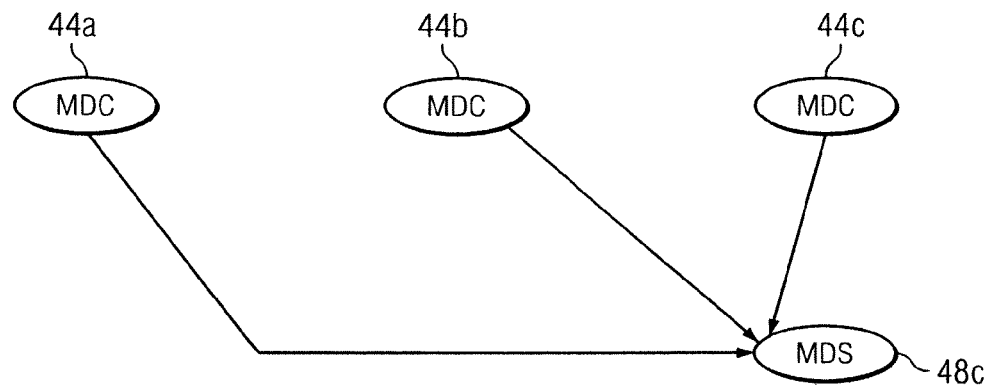
Figure 14H:
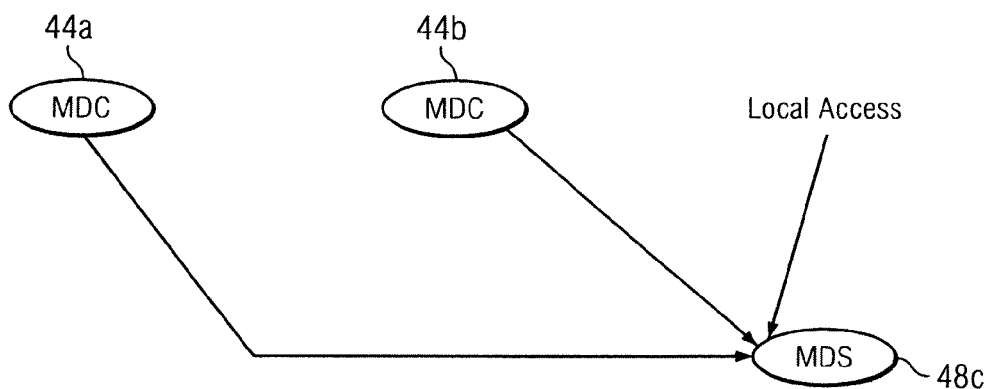

The stages of the relocation process are illustrated in FIGS. 14A-14H. As illustrated in FIG. 14A, during normal operation the metadata clients (MDCs) 44a and 44c at nodes 22a and 22c send token requests to metadata server (MDS) 48b on node 22b. When a relocation request is received, metadata server 48b sends a message to node 22c to create a prototype metadata server 48c as illustrated in FIG. 14B. A new metadata client object is created on node 22b, as illustrated in FIG. 14C, but initially messages to the prototype metadata server 48c are blocked. Next, all of the metadata clients 44a are instructed to detarget messages for the old metadata server 48b, as illustrated in FIG. 14D. Then, as illustrated in FIG. 14E, the new metadata server 48c is instantiated and is ready to process the messages from the clients, so the old metadata server 48b instructs all clients to retarget messages to the new metadata server 48c, as illustrated in FIG. 14F. Finally, the old metadata server 48b node 22b is shut down as illustrated in FIG. 14G and the metadata client 44c is shut down on node 22c as illustrated in FIG. 14H. As indicated in FIG. 3, the token client 46c continues to provide local access by processing tokens for applications on node 22c, as part of the metadata server 48c.

Interruptible Token Acquisition

Preferably interruptible token acquisition is used to enable recovery and relocation in several ways: (1) threads processing messages from failed nodes that are waiting for the token state to stabilize are sent an interrupt to be terminated to allow recovery to begin; (2) threads processing messages from failed nodes which may have initiated a token recall and are waiting for the tokens to come back are interrupted; (3) threads that are attempting to lend tokens which are waiting for the token state to stabilize and are blocking recovery/relocation are interrupted; and (4) threads that are waiting for the token state to stabilize in a filesystem that has been forced offline due to error are interrupted early. Threads waiting for the token state to stabilize first call a function to determine if they are allowed to wait, i.e. none of the factors above apply, then go to sleep until some other thread signals a change in token state.

To interrupt, CORPSE and KORE each wake all sleeping threads. These threads loop, check if the token state has changed and if not attempt to go back to sleep. This time, one of the factors above may apply and if so a thread discovering it returns immediately with an "early" status. This tells the upper level token code to stop trying to acquire, lend, etc. and to return immediately with whatever partial results are available. This requires processes calling token functions to be prepared for partial results. In the token acquisition case, the calling process must be prepared to not get the token(s) requested and to be unable to perform the intended operation. In the token recall case, this means the thread will have to leave the token server data structure in a partially recalled state. This transitory state is exited when the last of the recalls comes in, and the thread returning the last recalled token clears the state. In lending cases, the thread will return early, potentially without all tokens desired for lending.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method for establishing a new cluster membership of computer system nodes sharing direct read/write access to storage devices via a storage area network and a cluster operating system, the method comprising:
   initiating operation of a node;
   transitioning the node into a nascent state;
   detecting by the node heartbeat signals from other nodes;
   transmitting by the node its heartbeat signal;
   determining that a sufficient number of heartbeat signals have been detected sufficient to form a viable cluster;
   determining that an established cluster exists in response to detecting sufficient nodes to form a viable cluster;
   receiving at the node a request for information from a node in a leader state;
   transitioning the node to a follower state in response to the request;
   transmitting by the node identification information in response to the request to the node in the leader state;
   receiving at the node a membership proposal and information pertaining to all nodes in the proposed membership from the node in the leader state;

accepting membership by the node in the proposed membership in the cluster;
transitioning the node to a stable state; and
forming a viable cluster including all nodes in the membership proposal.

2. The method of claim 1, further comprising:
transitioning the node to a dead state in response to an insufficient number of nodes to form a cluster.

3. The method of claim 1, further comprising:
transitioning the node to the follower state for cluster membership reestablishment in response to a node in the cluster changing to the leader state.

4. The method of claim 3, further comprising:
transitioning the node to the stable state upon reestablishing the cluster membership.

5. The method of claim 1, further comprising:
requesting by the node withdrawal from the cluster membership;
receiving by the node an acknowledgment from the node in the leader state; and
transitioning the node to a shutdown state.

6. The method of claim 1, further comprising:
transitioning the node to the follower state in response to a number of nodes falling below a level sufficient for a viable cluster.

7. The method of claim 6, further comprising:
transitioning the node to a dead state upon failure to establish a viable cluster.

8. A system for establishing a new cluster membership of computer system nodes sharing direct read/write access to storage devices via a storage area network and a cluster operating system, comprising:
a processor;
a memory;
one or more software modules that are stored in memory and executed by the processor to:
initiate the operation of a node;
transition the node into a nascent state;
detect heartbeat signals from other nodes;
transmit a heartbeat signal from the node;
determine whether a sufficient number of heartbeat signals have been detected is sufficient to form a viable cluster;
determine whether an established cluster exists in response to detecting sufficient nodes to form a viable cluster;
receipt at the node a request for information from a node in a leader state;
transition the node to a follower state in response to the request;
transmit identification information in response to the request for information to the node in the leader state;
receipt at the node a membership proposal and information pertaining to all nodes in the proposed membership from a node in the leader state;
accept membership by the node in the proposed membership in the cluster;
transition the node to a stable state; and
form a viable cluster including all nodes in the membership proposal.

9. The system of claim 8, wherein the one or more software modules are executable by the processor to transition the node to a dead state in response to an insufficient number of nodes to form a cluster.

10. The system of claim 8, wherein the one or more software modules are executable by the processor to transition the node to the follower state for cluster membership reestablishment in response to a node in the cluster changing to the leader state.

11. The system of claim 10, wherein the one or more software modules are executable by the processor to transition the node to the stable state upon reestablishing the cluster membership.

12. The system of claim 8, wherein the one or more software modules are executable by the processor to request withdrawal from the cluster membership, wherein the one or more software modules are executable by the processor to transition receive an acknowledgment from the node in the leader state, and wherein the one or more software modules are executable by the processor to transition the node to a shutdown state.

13. The system of claim 8, wherein the one or more software modules are executable by the processor to transition the node to the follower state in response to a number of nodes falling below a level sufficient for a viable cluster.

14. The system of claim 13, wherein the one or more software modules are executable by the processor to transition the node to a dead state upon failure to establish a viable cluster.

15. A non-transitory computer readable storage medium having embodied thereon a program executable by a processor to perform a method for establishing a new cluster membership of computer system nodes sharing direct read/write access to storage devices via a storage area network and a cluster operating system, the method comprising:
initiating operation of a node;
transitioning the node into a nascent state;
detecting by the node heartbeat signals from other nodes;
transmitting a heartbeat signal by the node;
determining whether a sufficient number of heartbeat signals have been detected sufficient to form a viable cluster;
determining whether an established cluster exists in response to detecting sufficient nodes to form a viable cluster;
receiving at the node a request for information from a node in a leader state;
transitioning the node to a follower state in response to the request;
transmitting by the node identification information in response to the request to the node in the leader state;
receiving at the node a membership proposal and information pertaining to all nodes in the proposed membership from a node in the leader state;
accepting membership by the node in the proposed membership in the cluster;
transitioning the node to a stable state; and
forming a viable cluster including all nodes in the membership proposal.

16. The non-transitory computer readable storage medium of claim 15, wherein the method includes transitioning the node to a dead state in response to an insufficient number of nodes to form a cluster.

17. The non-transitory computer readable storage medium of claim 15, wherein the method includes transitioning the node to the follower state for cluster membership reestablishment in response to a node in the cluster changing to the leader state.

18. The non-transitory computer readable storage medium of claim 17, wherein the method includes transitioning the node to the stable state upon reestablishing the cluster membership.

19. The non-transitory computer readable storage medium of claim 15, wherein the method includes requesting withdrawal from the cluster membership, wherein the method includes receiving an acknowledgment from the node in the leader state, and wherein the method includes transitioning the node to a shutdown state.

20. The non-transitory computer readable storage medium of claim 15, wherein the method includes transitioning the node to the follower state in response to a number of nodes falling below a level sufficient for a viable cluster and transitioning the node to a dead state upon failure to establish a viable cluster.

\* \* \* \* \*